J. B. KITCH.
BOX ASSEMBLING AND NAILING MACHINE.
APPLICATION FILED JUNE 6, 1912.

1,244,986.

Patented Oct. 30, 1917.
13 SHEETS—SHEET 1.

Witnesses
W. A. Williams
I. I. Keenan

Inventor
Joseph B. Kitch
By Roberton & Johnson
Attorneys

J. B. KITCH.
BOX ASSEMBLING AND NAILING MACHINE.
APPLICATION FILED JUNE 6, 1912.

1,244,986.

Patented Oct. 30, 1917.
13 SHEETS—SHEET 6.

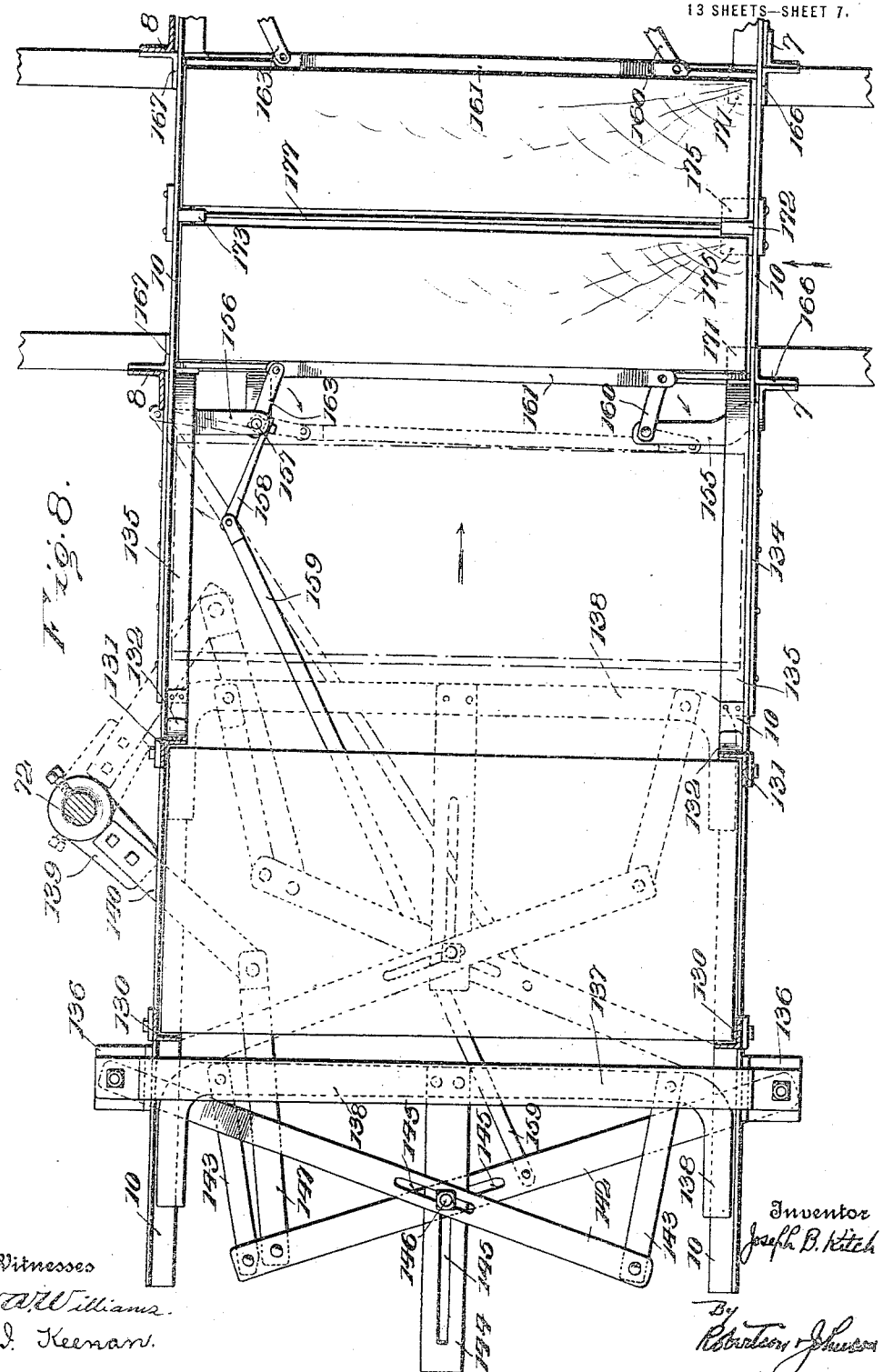

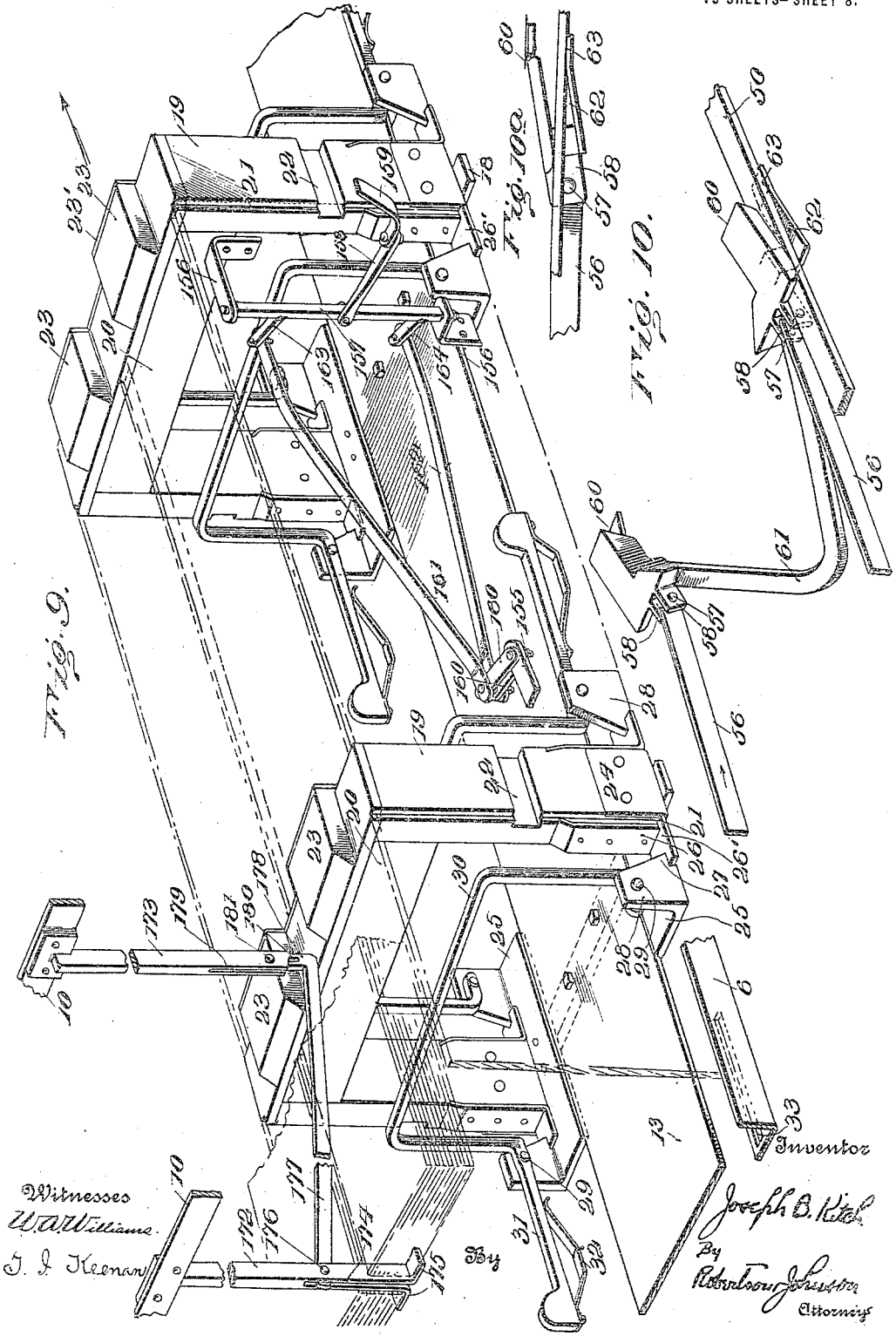

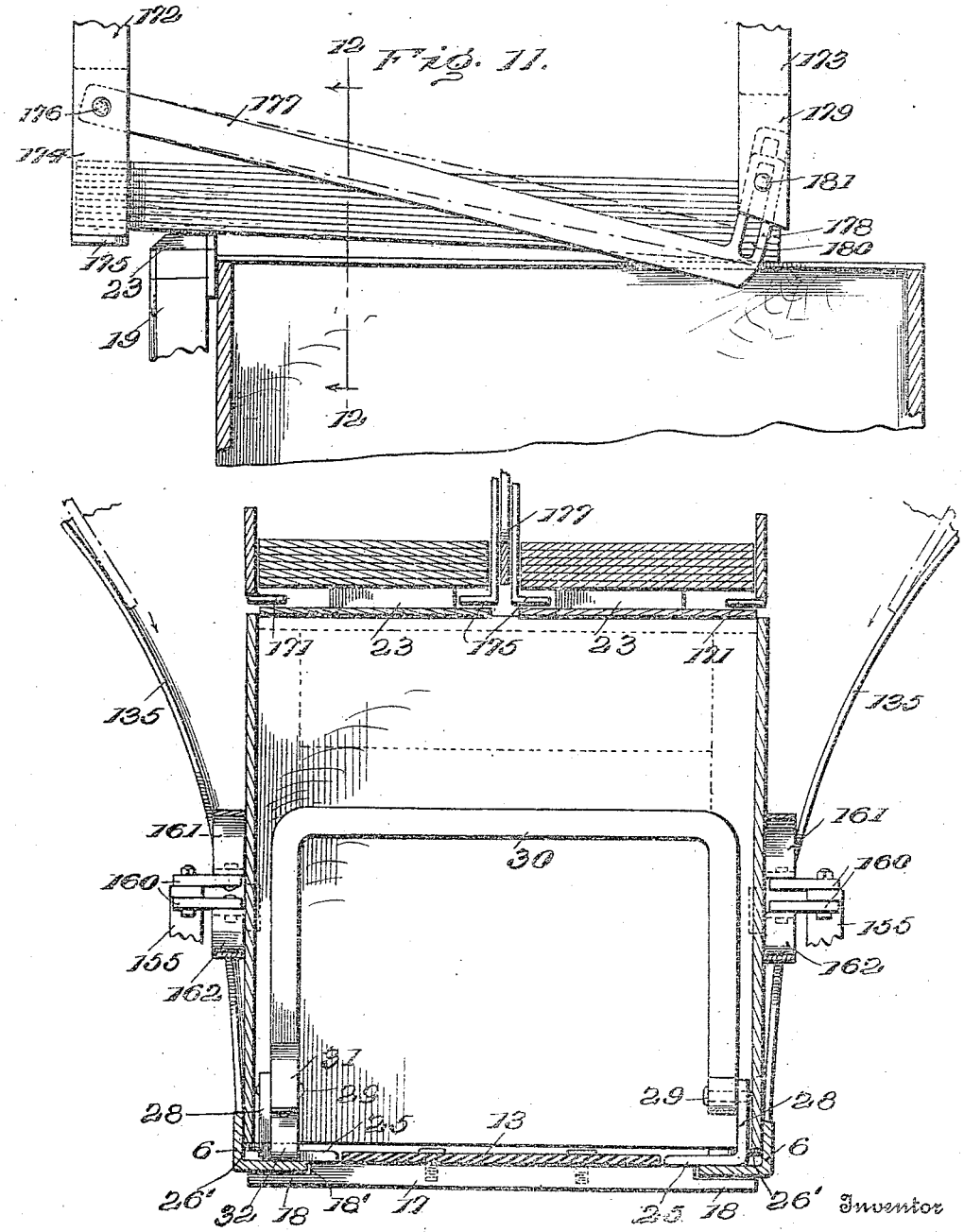

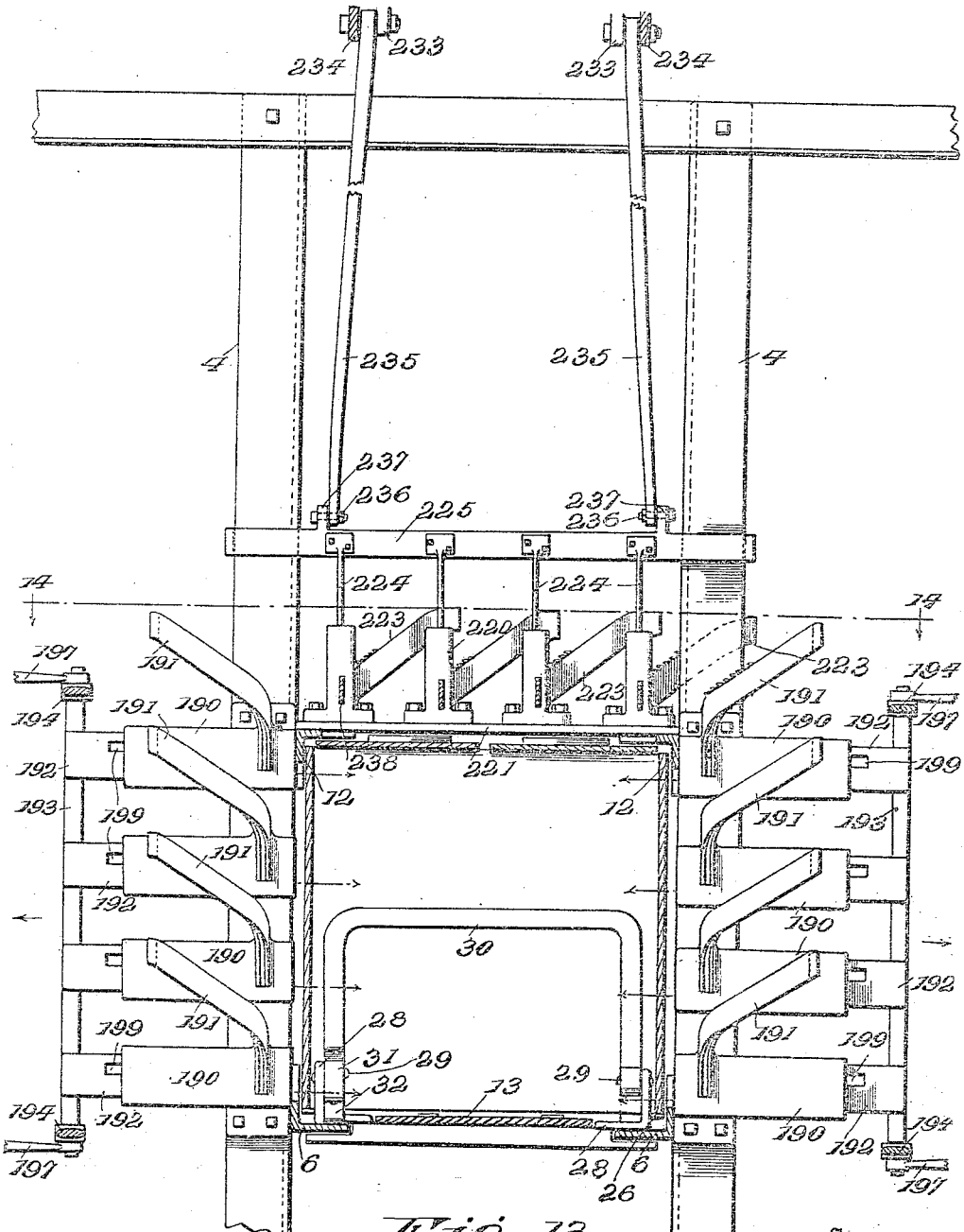

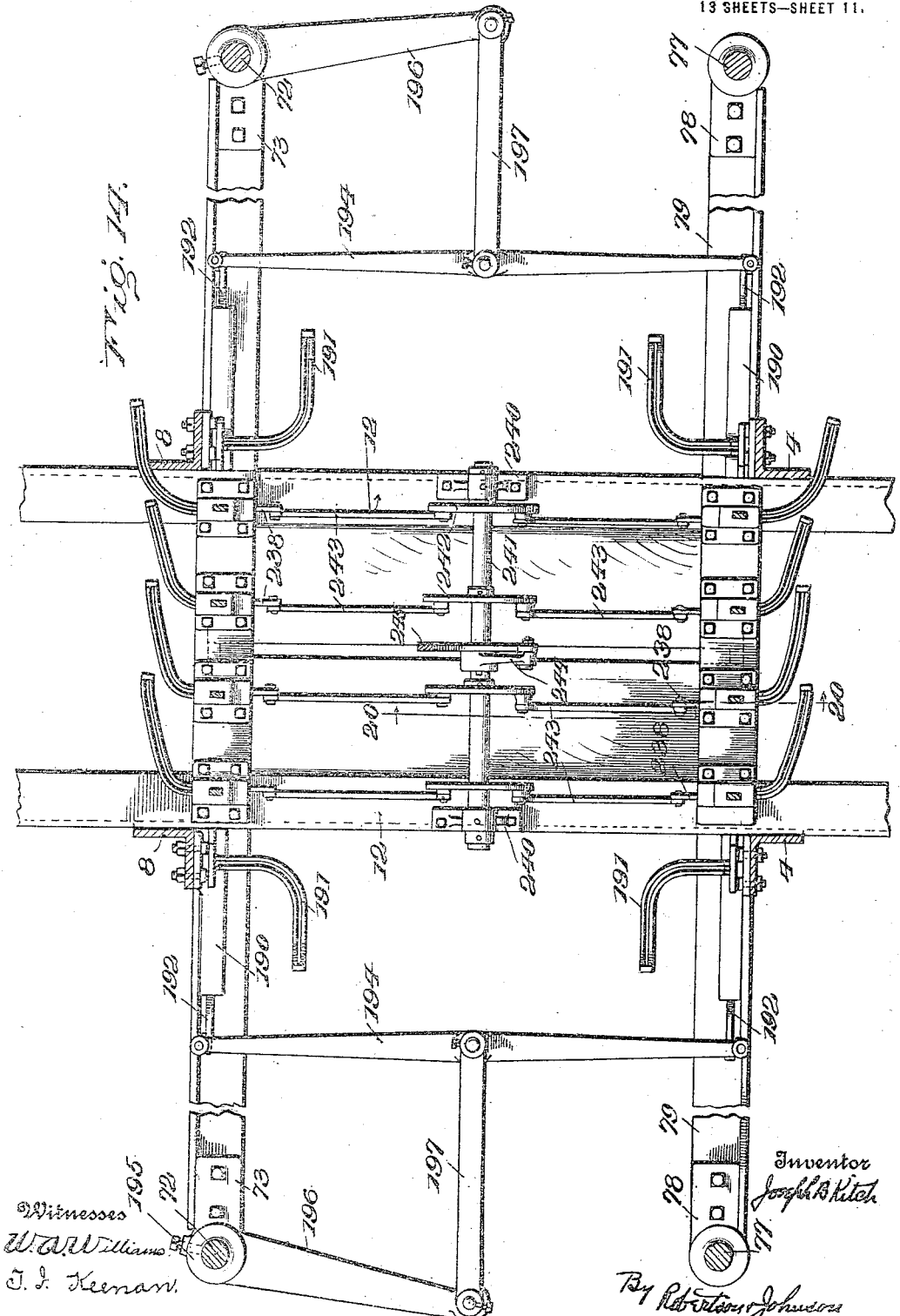

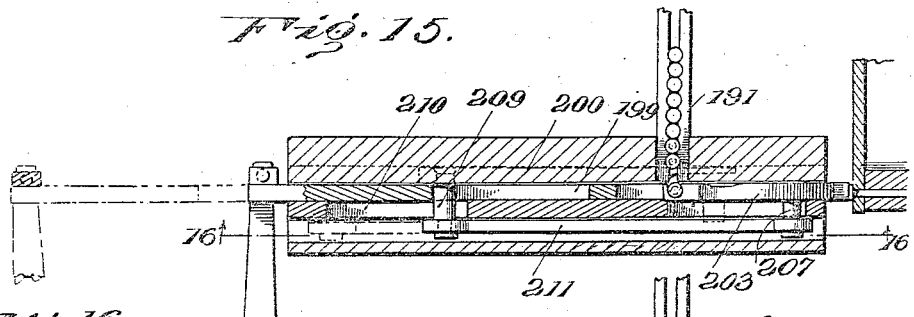

J. B. KITCH.
BOX ASSEMBLING AND NAILING MACHINE.
APPLICATION FILED JUNE 6, 1912.

1,244,986.

Patented Oct. 30, 1917.
13 SHEETS—SHEET 13.

Witnesses
W. A. Williams
J. I. Keenan

Inventor
Joseph B. Kitch
By Robertson & Johnson
Attorneys

UNITED STATES PATENT OFFICE.

JOSEPH B. KITCH, OF CEDAREDGE, COLORADO.

BOX ASSEMBLING AND NAILING MACHINE.

1,244,986.   Specification of Letters Patent.   Patented Oct. 30, 1917.

Application filed June 6, 1912. Serial No. 702,131.

*To all whom it may concern:*

Be it known that I, JOSEPH B. KITCH, a citizen of the United States of America, and a resident of Cedaredge, in the county of Delta and State of Colorado, have invented certain new and useful Improvements in Box Assembling and Nailing Machines, of which the following is a specification.

My invention relates to box assembling and nailing machines and has as its object the provision of a compact and efficient machine of this character having numerous novel features. Among these are the general arrangement and collocation of the different parts of the machine, the various blank feeds, the former support, the blank positioning and holding devices, the nailing mechanism, and the means for operating the machine. While it is obvious that many of these features may be employed with advantage by themselves or in machines of very different types, I have combined them in a machine which has the following general arrangement. A former support movable step by step is provided and above this are arranged magazines holding the various blanks, there being three successive stations arranged lengthwise of the machine in which direction the former support moves, said stations corresponding to three successive movements of the former support. Blanks are fed to each of said stations and at the third station the box is completed. A shortening of the machine is made possible by arranging two of the blank magazines face to face and near together, providing the former support with dividers spaced apart one dimension of the box to be formed, and employing a special mechanism for feeding a pair of blanks from said magazines to each side of said former support. The means for feeding the various blanks are such as to permit the assistance of gravity.

The above is merely suggestive and by no means exhaustive and for a complete understanding of the invention and of its scope reference should be had to the specification and to the claims appended thereto in which the invention is more particularly set forth.

Referring to the drawings.

Figure 2:
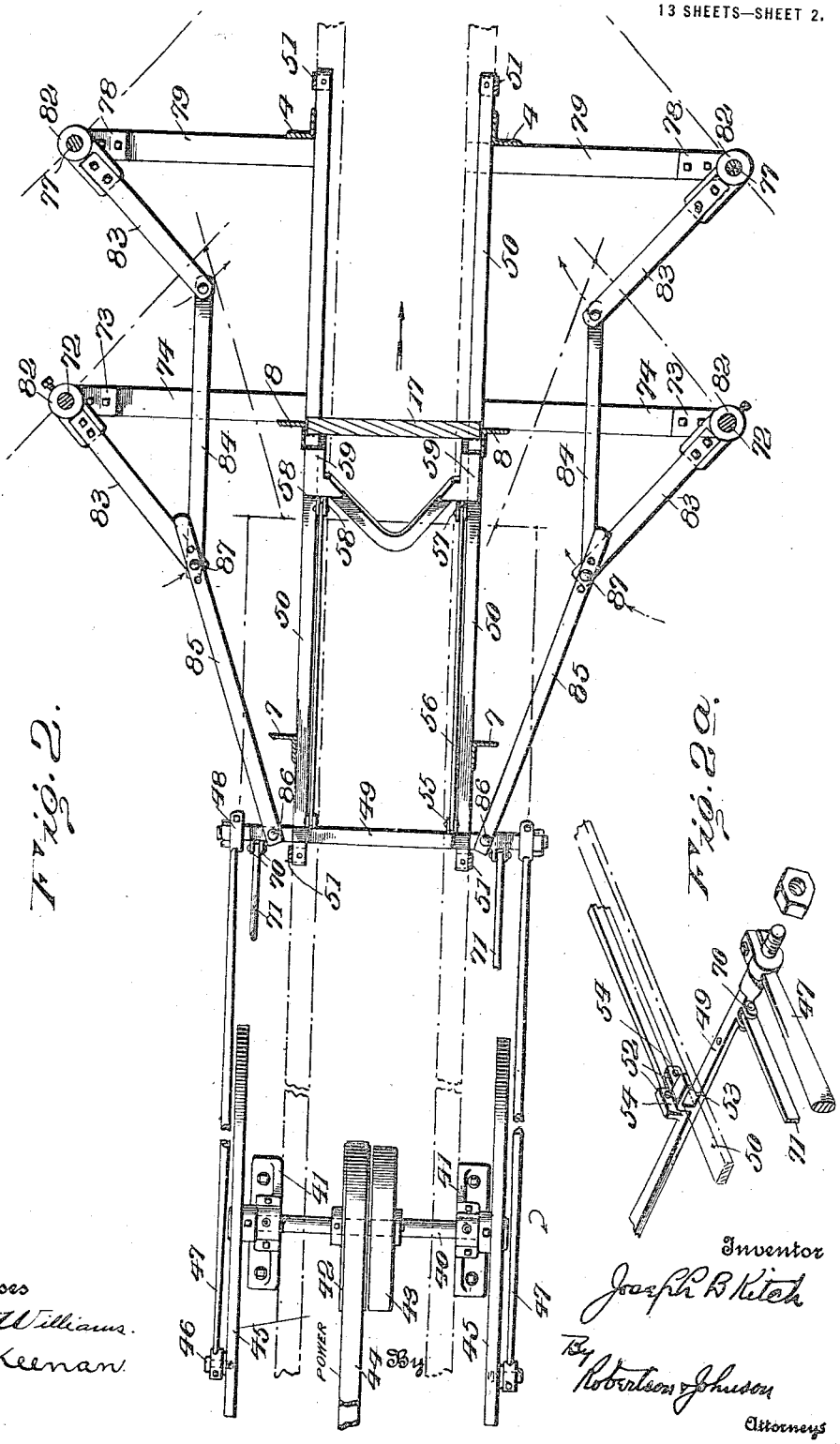
Fig. 2 is an incomplete section and plan illustrating the driving connections and the operating slide for the former support.

Fig. 2ª is a detail view of parts of the slide illustrated in Fig. 2 showing the manner in which it is supported and guided.

Figure 1:
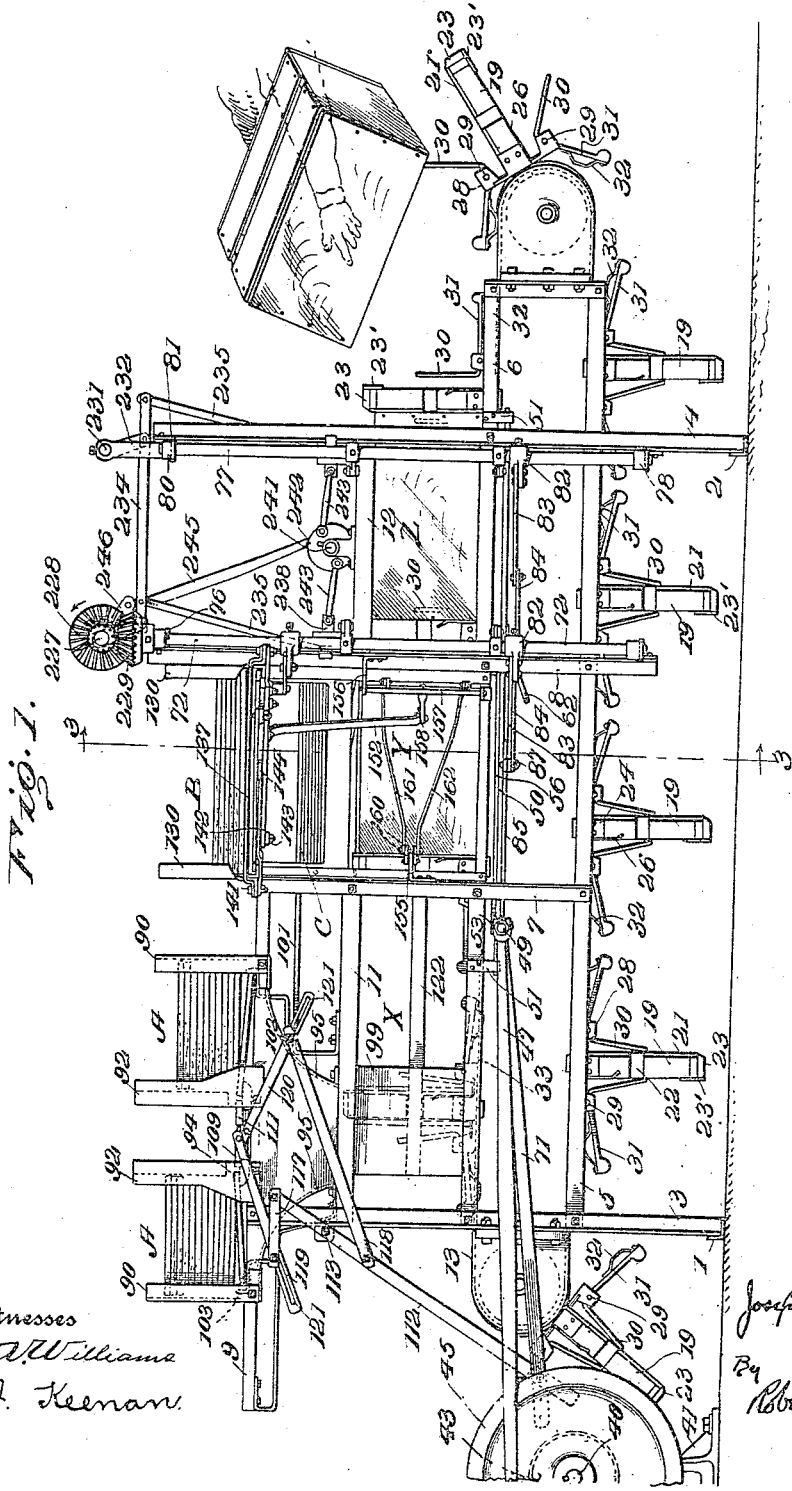
Figure 1 is a side elevation of the entire machine.
Figure 3:
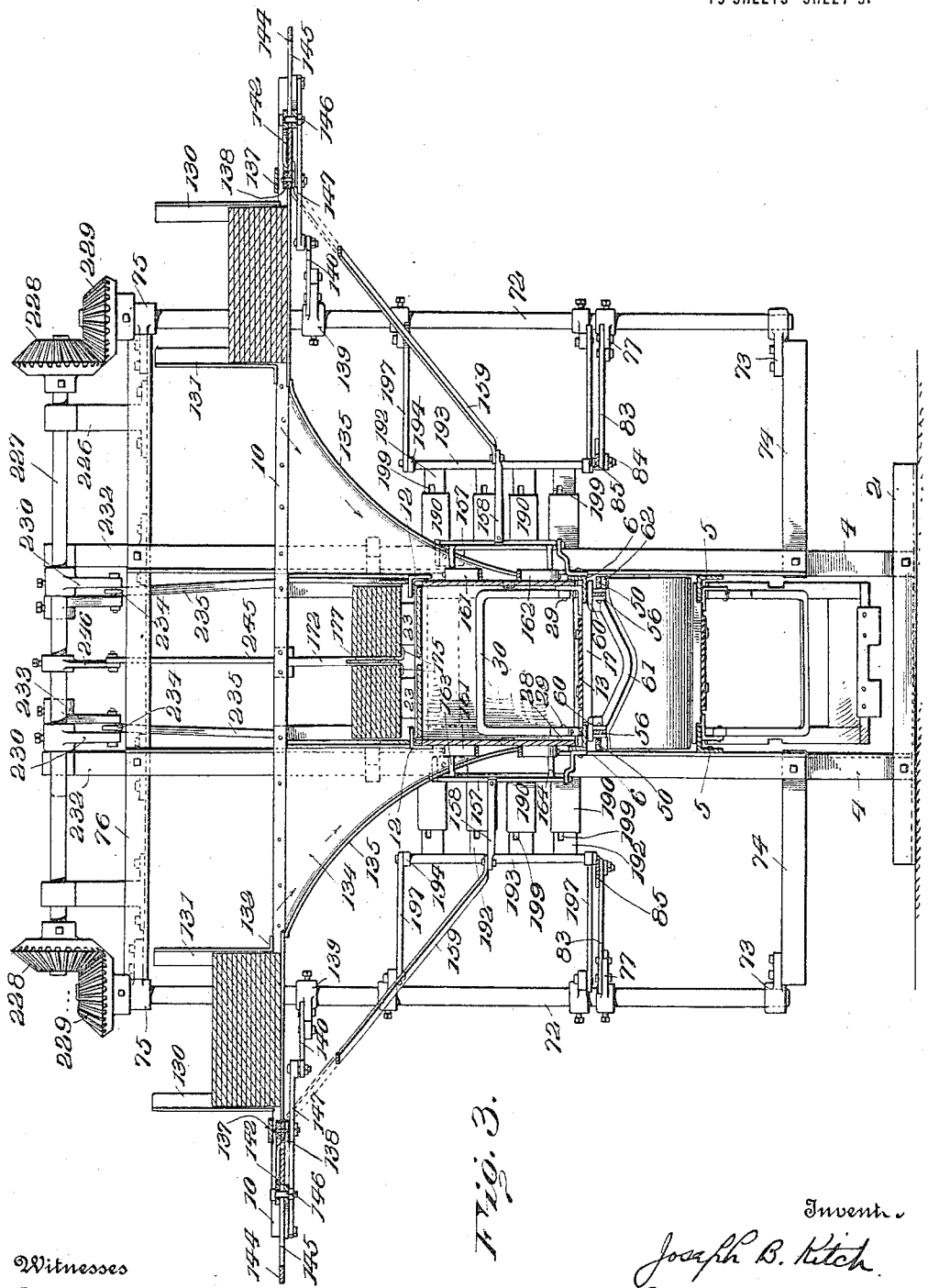

Fig. 3 is a vertical transverse section on the line 3—3, Fig. 1.

Figure 4:
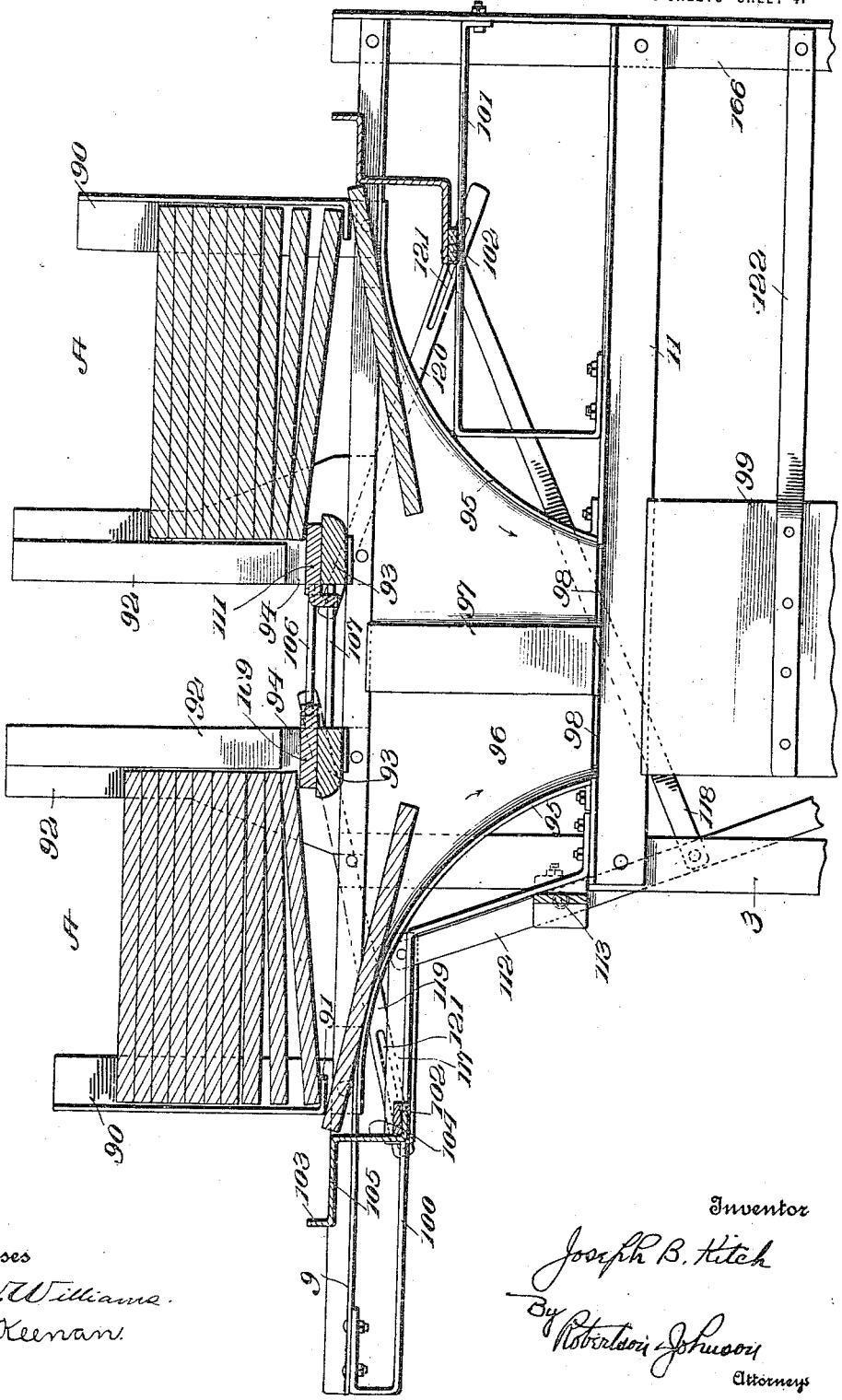

Fig. 4 is an enlarged central longitudinal section through the box end magazines and the feeding devices therefor.

Figure 5:
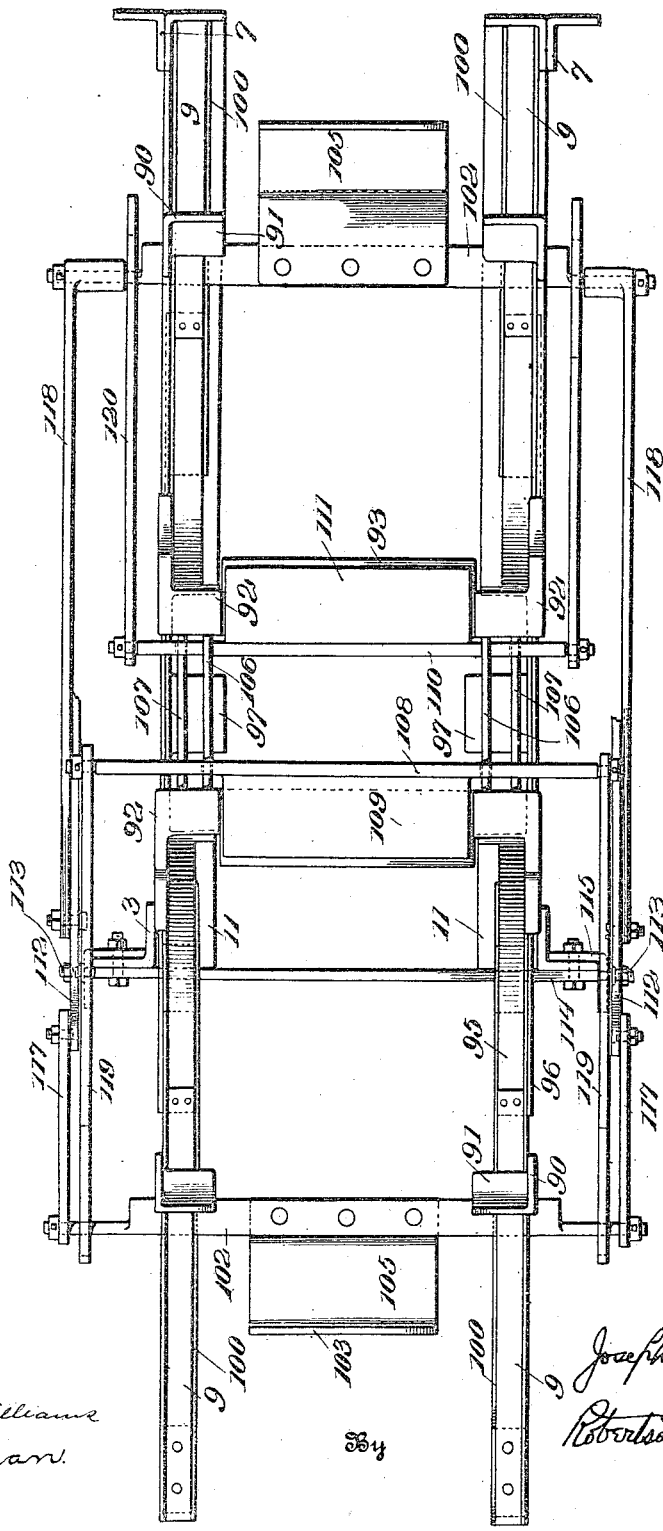

Fig. 5 is a plan view corresponding to Fig. 4.

Figure 6:
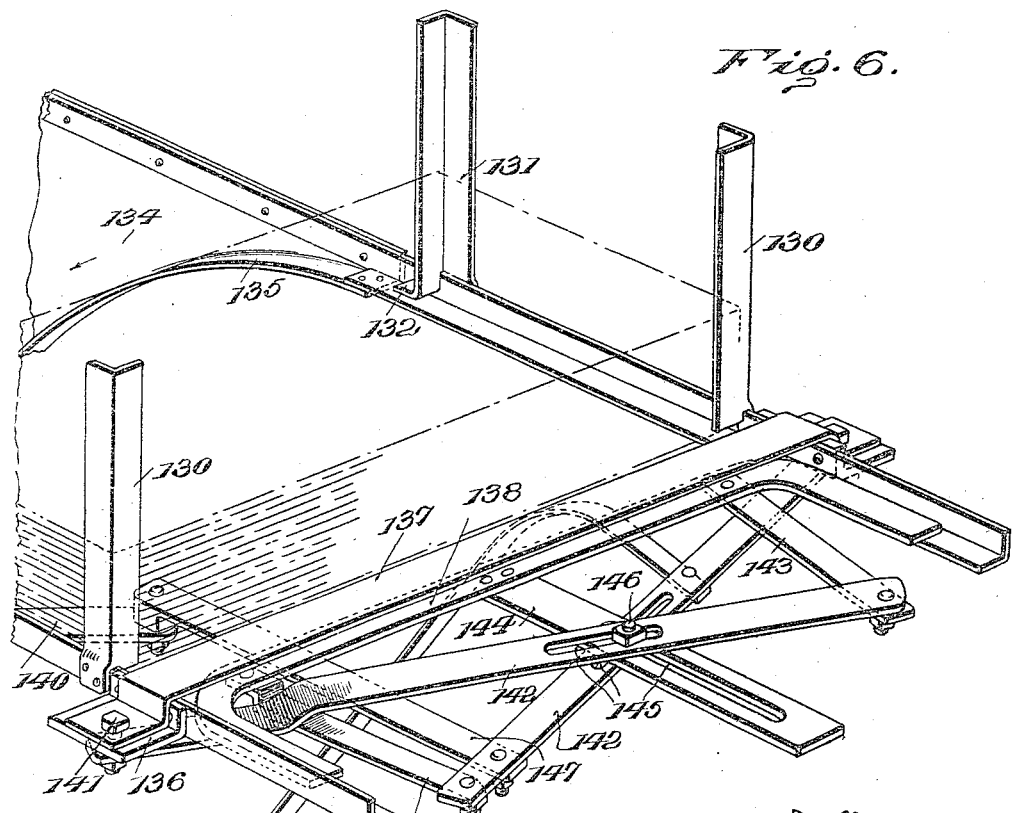

Fig. 6 is a perspective view illustrating one of the box side magazines and the feeding devices associated therewith.

Figure 7:
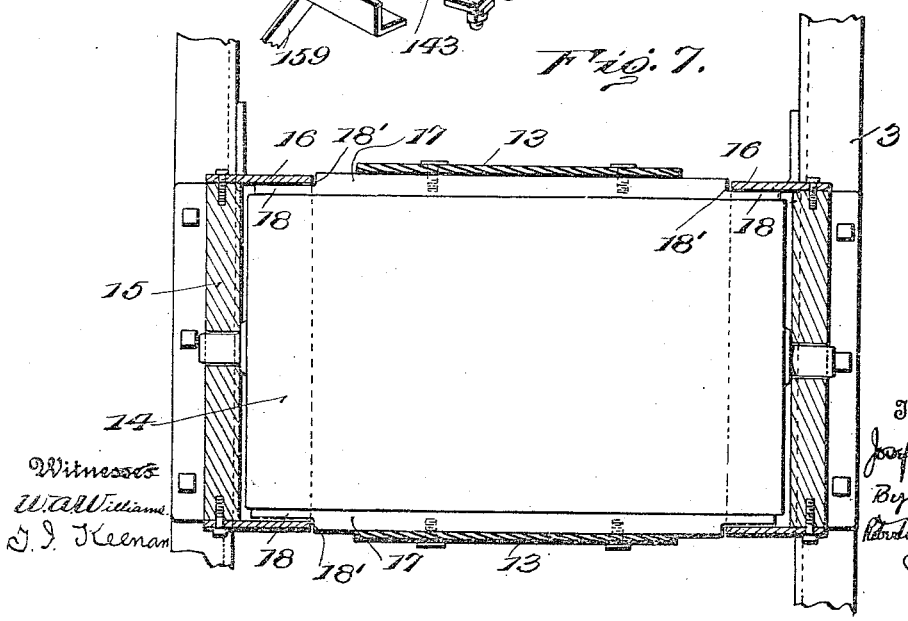

Fig. 7 is a vertical section through the end of the former support and adjacent parts of the frame showing in elevation the roller around which the former support passes.

Fig. 8 is a section and plan of the box side magazines, the related feeding mechanism and the box side positioning and holding means.

Fig. 9 is a perspective view showing the former support at the second station, the related blank clamping and positioning devices and parts of the box top magazine.

Fig. 10 is a detail perspective view of the gravity feeding pawl for the former support.

Fig. 10ª is a fragmentary side elevation of one member of the double feeding pawl showing its relation to the guide rail.

Fig. 11 is a side elevation of parts of the box top magazine illustrating the vertically movable support and showing in section the box being formed.

Fig. 12 is a vertical section on the line 12—12, Fig. 11, illustrating the construction of the box top magazine showing also the turner guides and blank positioning and holding means for the box sides and the former support.

Fig. 13 is a vertical section on the line 13—13, Fig. 1, showing the nailing mechanism but omitting various other parts for clearness.

Fig. 14 is a horizontal section and plan on the line 14—14, Fig. 13.

Fig. 15 is an enlarged horizontal section through one of the side nailers.

Fig. 16 is a vertical section on the line 16—16, Fig. 15.

Fig. 17 is an enlarged section in the plane of a nailing channel for a side nailer.

Fig. 18 is a perspective view showing the interior construction of the side nailer head and the driver slide, the nail cut-off and pivoted nail carrier being removed from the nailer head in order to show the construction clearly.

Figure 19:
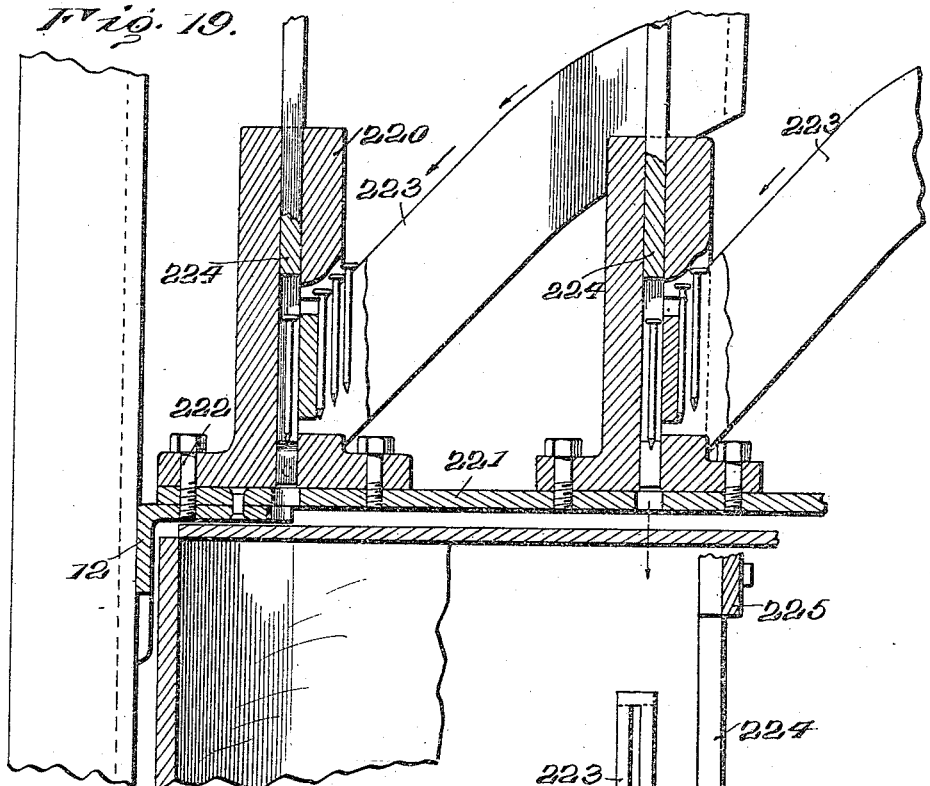
Figure 20:
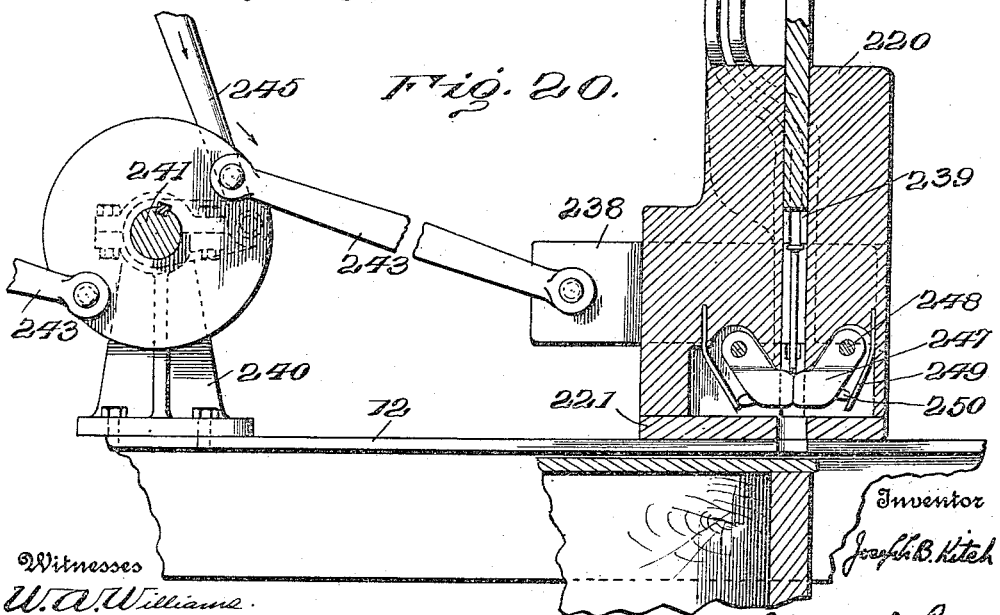

Fig. 19 is an enlarged detail fragmentary view in vertical section through two of the top nailers in the plane of the nail channels, and Fig. 20 is a detail fragmentary sectional view in a plane at right angles to that of Fig. 19.

Referring more particularly to Figs. 1, 3 and 14: The machine embodying my invention and illustrated in the drawings is provided with a frame which may conveniently be constructed of angle irons arranged in horizontal and in vertical planes. At the head of the machine is the cross piece or base 1, and at the foot the corresponding cross piece 2. A pair of uprights 3 is secured to the base 1 at the head of the machine and a pair of uprights 4 is secured to the cross piece 2 at the foot of the machine, the members of said pairs being spaced apart slightly more than the width of the box to be formed. A pair of horizontal angle irons 5 and another pair of angle irons 6, located above the first, extend lengthwise of the machine and connect corresponding members of the pairs of uprights 3—4. The angle irons 5 of the lower pair have their vertical flanges extending downward and the angle irons 6 of the upper pair have their vertical flanges extending upward. This leaves a passage lengthwise of the machine in which moves the former support to be hereinafter described both pairs of angle irons constituting guide rails for the respective flights of the former support. The upper pair of angle irons 6 provides what I have termed the lower deck. Between the uprights 3—4 are pairs of uprights 7—8 having one member of each pair at each side of the machine. These pairs of uprights are spaced apart in the direction of the length of the machine slightly more than the length of the box to be formed and are located at the second of the three stations to which I have heretofore referred. For convenience these stations are designated, respectively, by the letters X, Y, Z.

At the top of the machine are located the horizontal angle irons 9 which support the box end magazines A directly over the former support and nearer together than the distance between the back and the front edge of the blank, and in the machine as illustrated nearer together than the least dimension of the box to be formed. Extending transversely across the machine at the top is a pair of horizontal angle irons 10 spaced apart slightly more than the length of the box. These with the angle irons 9 constitute the upper deck of the machine and support the box side magazines B which are symmetrically located one at each side of the central longitudinal plane of the machine. Between the upper and lower decks at the front of the machine are horizontal angle irons 11 one at each side of the machine and forming a pair and near the foot of the machine at the third station are horizontal angle irons 12 one at each side of the machine and forming a pair. These form an intermediate deck on a level with which the box top magazine is located.

*Former Support.*

Referring more particularly to Figs. 1, 3 and 9: The former support which is moved forward step by step a little more than the length of the box to be formed at each step is provided with formers which are in the nature of dividers, each box being formed between a pair of adjacent dividers. The former support which carries the said dividers consists of a belt 13, running on rollers 14 suitably mounted at each end of the frame in brackets 15 secured to the uprights 3 and 4 and provided with guide strips 16. The belt 13 has secured on its under side a number of transverse cleats 17 spaced apart substantially the length of the box to be formed plus the thickness of a divider and having reduced ends 18 lying just underneath the guide rails 6 or over the rails 5 according to which reach of the belt is considered. The construction provides shoulders 18′ which act as guides and spacers. These cleats support the dividers which are shown as comprising uprights 19 and top cross pieces 20 it not being necessary that they should be solid blocks. The front face of each divider acts to square the box. The divider is constructed to receive the forward ends of said blanks in case they project beyond its rear face. The rear outer edges of the uprights are rabbeted at 21 to leave room for the other end of the box sides where these are a fraction long and therefore project beyond the face of the divider. The said uprights are provided with horizontal grooves 22 for coöperation with stationary parts of the mechanism to be hereinafter described. Each top cross piece 20 is provided with a pair of feeding projections 23 which are preferably protected by metal plates 23' and whose function will subsequently appear. The opposing faces of adjacent dividers are spaced apart substantially the length of the box to be formed so that the central transverse planes through successive dividers are spaced apart substantially the length of the box to be formed plus the thickness of a divider. The dividers are secured to upright members 24 of plates 25 fastened to the upperside of the cleats in corresponding locations at each end thereof and in sliding contact with the rails 6. The rigidity of the connection between the uprights 19 and the cleats 17 and therefore the belt 13 is increased by angle plates the vertical members 26 of which are secured to the sides of the uprights 19 and the horizontal members 26' of which rest on the tops of the plates 25 and extend under shoulders 27 on lugs 28 thereon and project outside of the plane of the lugs 28 to form supports for the box sides. To avoid interference with the box blanks the upper ends of the vertical members 26 of the angle plates are bent and extended into the face of the uprights 19. Each pair of lugs 28 is spaced away from the face of the adjacent divider to leave ample room for a box end. In each pair of lugs 28 is pivoted at 29 a clamping member 30 which I have shown as a bar bent in the shape of a bale and extending up a considerable distance toward the top of the divider to prevent the box ends from overbalancing. Each of these clamping members is provided with a tail 31 to the under side of which is secured at one end the spring 32 which is bent to present a bevel in each direction. The tails of the members of a pair of clamps are located at opposite sides of the belt and are in sliding contact with the guide rails 6 which have slots 33 which control the position of the clamping members, the members being in clamping position except when the springs fall into said slots which are located to cause the clamping members to open at X, to close between X and Y and to remain closed until after Z is passed.

The principal objects attained by the structure above described are the securing of a firm and permanent connection between the dividers and the belt which maintains them in their proper spaced relation but does not interfere with the flexibility of the belt. The upper flight of the former support is guided and supported by the horizontal flanges of the angle irons 6 on which the plates 25 slide. The lower flight is supported by the horizontal flanges of the angle irons 5 which act as guides on which slide the reduced ends 18 of the cleats 17. It will be noted that the tails of the clamping members fall away from the guide rails 5 when the clamping members are on the lower flight. The springs with which the tails are provided cause the clamping members to exert a firm continuous pressure on the blanks even when these are not absolutely uniform. Since the clamping members extend completely across the blanks, any blanks which may have warped are flattened.

*Driving Means.*

The driving devices are most clearly shown in Figs. 1, 2, 2ª, 3 and 10 to which reference should now be had. The shaft 40 journaled in bearings in the standards 41 is provided with loose and fast pulleys 42 and 43 respectively. 44 indicates the driving belt. At each end of the shaft 40 are cranks which are shown in the form of disks 45 to which are pivotally secured by wrist pins 46 the pitmen 47 whose other ends are pivotally secured at 48 to cylindrical portions of a transverse reciprocating driving slide 49. All the moving parts of the machine are driven from this slide and this is a convenient and simple arrangement although it is not indispensable. The driving slide 49 is supported from guide rails 50 supported by brackets 51 which extend down from each of the guide rails 6 at each side of the machine. The driving slide 49 is flat and is provided with two pairs of ears 52 located just inside the guide rails 50. All these ears project forward from the driving slide and the ears adjacent the guide rails 50 extend across the slide and are provided with horizontal lugs 53, which rest on the flat upper surface of the guide rails and thus support driving slide 49. The vertical face of each ear having the lugs 53 is in sliding contact with the adjacent vertical face of the corresponding guide rail 50 so that the slide is accurately maintained in its transverse position. Holes 54 are provided in the pairs of ears 52 for the purpose of pivotally securing thereto, by means of suitable pins 55, links 56, the other ends of which are pivotally secured by pins 57 to pairs of ears 58 with which each member of a double weighted pawl is provided. Each member 59 has an active face 60 for coaction with the edge of the cleats 17 the provision of two members keeping the former support and the dividers in correct position and insuring an accurate feed. The members 59 are connected by a backwardly extending portion 61 which serves as a weight. Each member consists of two parts, the pawl proper which lies upon the top of a guide 50 and slides thereon and the ledge 62 extending lengthwise underneath the guide 50 and having its connection with the pawl member near the inner side of the said rail. It will thus be seen that the pawl member straddles the guide 50. Each ledge 62 has its end 63 projecting forward and lying in a plane at an angle to that of the rest of the ledge. These ledges being located just under the guide rails 50 slide along them, the ends 63 preventing the double weighted pawl from being thrown too far up by the weight 61 and maintaining both pawl members in proper position. The throw of the cranks 45 is such that the driving slide 49 and the dougle weighted pawl 59 feed the former support through coaction of said pawl and one of the cleats 17, substantially the length of the box plus the width of a divider on the forward half of the stroke but are inoperative on the rear half of the stroke so that the feed is intermittent.

The driving slide 49 has pairs of ears 70 in which are pivoted the ends of pitmen 71 from which the box end feed to be hereinafter described is driven.

Vertical rock shafts 72 are supported at each side of the machine in bearings 73 secured to horizontal beams 74 near the bottom of the machine and in alined bearings 75 secured to beams 76 at the top of the machine. In the rear of these vertical rock shafts and spaced from them substantially the length of the box to be formed is a second pair of vertical rock shafts 77 supported in bearings 78 secured to horizontal beams 79 corresponding to the beam 74 and having also bearings 80 secured to horizontal beams 81 corresponding to the beams 76. Each of these four shafts is provided with an adjustable collar 82 located a little below the plane of the guide rails 50 and having an arm 83. Links 84 connect each pair of arms being pivotally secured thereto. Pitman 85 pivoted at 86 to the driving slide 49 and at 87 to the forward of the two arms 83 and to the link 84 constitute the driving connection by which the reciprocation of the driving slide 49 is transformed into oscillation of the rock shafts. The construction is the same at each side of the machine. The various mechanisms driven from these rock shafts will be hereinafter explained and the operation of the driving connection followed through.

Box End Feed.

Referring more particularly to Figs. 1, 4 and 5: The box end magazines A are oppositely located face to face on the top deck of the machine directly over the former support. As will shortly appear, blanks from the two magazines are fed therefrom toward each other and are permitted to pass by gravity being suitably guided to the former support at opposite sides of the dividers. The construction and arrangement of the feeding devices is such that I am enabled to place the two magazines near together, much nearer, indeed, than the least dimension of the box to be formed. This makes the structure very compact. Each magazine may be simply and conveniently constructed by securing to the angle irons 9, corner posts, one pair of which 90, at the feed end of the magazine, I prefer to make of angle irons having horizontal transverse ledges 91 raised sufficiently above the horizontal flanges of the angle irons 9 to leave more than sufficient room for the passage of a box blank. I have shown the other pair of corner posts 92 which are located at the opposite end of each magazine as of a heavier construction and as connected by horizontal supporting ledges 93, each post being provided with a horizontal slot 94 adjacent the ledge. The plane of the ledges 93 is above that of the ledges 91. Below each magazine is a gravity guiding device which it is most convenient and cheapest to make in the form of two inclined turner guides 95 which are preferably flanges on plates 96 secured at each side of the machine to the upright flanges of the angle irons 9 whose horizontal flanges are interrupted between the corner posts 90 of the two magazines. The plates 96 prevent the blanks from moving to either side and the turner guides 95 whose respective ends are secured to the angle irons 9 and 11 are preferably curved. The term turner guides has been applied to them since they receive the blanks in a plane approximately horizontal and deliver them in a plane approximating the vertical. Midway between the two magazines and their respective turner guides at each side of the machine and projecting transversely inward, is a dividing block 97 which prevents any interference between the blanks as they are fed from the respective magazines. The horizontal flanges of the angle irons 11 are cut away at 98 to form slots to avoid obstructing the passage of the blanks. Between the angle irons 11 and the guide rails 6 at each side of the machine, are plates 99 which perform the same function as the plates 98 and assist in locating the blanks in their proper relation on the former support.

The means for feeding the box end blanks is distinctly novel and embodies means for simultaneously feeding blanks first toward each other, then away from each other, and finally toward each other as they are simultaneously set free to the turner guides, the purpose being to free each blank first from its support at one end of the magazine and then from its support at the other and finally to move it onward and release it to the turner guides. This results in saving a great space which would be necessary for an ordinary direct feed. At the head of the machine and at each side thereof, I secure to the frame guides 100 having horizontal members located below the plane of the top deck. Other guides 101 having horizontal members below the plane of the top deck are secured to the frame at each side of the machine adjacent the second magazine, i. e., the one which is farther from the head of the machine. On these guides slide transverse bars 102 to which are secured feeders which are in the nature of ledges having vertical active feeding faces 103 and 104 and an intermediate horizontal portion 105 on which the end of the blank may rest. The feeding face 103 extends up far enough to coact with the lowest blank in the adjacent magazine and the feeding face 104 is located at the proper height to coact with the end of a blank after it has been completely released from the adjacent magazine.

Between the two magazines are arranged in different horizontal planes the pairs of guides 106 and 107. The transverse bar 108 carrying the feeder block 109 slides on the guides 106 and the transverse bar 110 carrying the feeder block 111 slides on the guides 107, said bars being provided with holes through which the said guides pass. As shown in Fig. 4 the blanks normally rest at one end on the pairs of ledges 91 and at the other end on the feeder blocks 109 and 111 respectively.

The means whereby the proper relative movements are given to these pairs of feeders are as follows: The pitmen 71 above referred to as pivotally secured in ears 70 on the slides 49 are pivotally connected at their other ends with levers 112 pivoted at each side of the frame at 113, which is the reduced end of a stiffening cross piece 114 secured to the uprights 3. The frame is further strengthened at this point by angle plates 115 which are also secured to the uprights 3. The connection between each pitman 71 and the corresponding lever 112 may be made adjustable by providing additional slots 116 in one of these members. Pairs of links 117 connect the upper ends of said levers with that one of the sliding bars 102 which is nearer the head of the machine and pairs of links 118 pivotally connected to the levers 112 below their pivots have their other ends pivotally connected to the other sliding bar 102. The transverse rods 108 and 110 to which are secured the feeders 109 and 111 are connected respectively to the front and rear bars 102 by pairs of links 119 and 120, a lost motion connection being in each instance provided by means of slots 121.

Figs. 1 and 4 illustrate the feeding means in two different positions. In Fig. 4 a pair of blanks already released from the magazine is about to be set free to the turner guides by the action of the vertical faces 104 of the feeding ledges, these ledges being moved toward each other by virtue of the connection just described. As the levers 112 turn about their pivots, the slots 121 permitting this movement without disturbing the feeder blocks 109 and 111, the ends of the blanks lying underneath ledges 91 and held thereby are pushed out from under the same and the blanks are thus set free to the turner guides. The bars 102 continuing to move toward each other reach the inner ends of the slots 121 thus retracting the feeder blocks 109 and 111 and permitting the far ends of the blanks to drop to the ledges 93. Almost immediately after this action has occurred the feeding face 103 of each reciprocating ledge comes into contact with the near end of the lowest blank and slides it onward as illustrated in Fig. 1, the near end being soon forced off the ledge 91 while at the same time the far end is moved over the ledge 93 into the slots 94. The difference in level of the ledges 91 and 93 assists in this operation and in that about to be described. On the return stroke each transverse bar 102 moves back some distance before reaching the other end of the slots 121 so that the feeding ledges with their feeding faces 103 and their horizontal portions 105 are out of the way before the feeders 109 and 111 are advanced through the connecting links 119 and 120. This movement of the said feeders brings them into contact with the far ends of the blanks which have been freed as above described from the ledges 91 and pushes them edgewise through the space between the under side of the ledges 91 and the turner guides 95, until the parts occupy the position shown in Fig. 4, in which the blank released completely from the magazine is held by its weight between the gravity guides and the under sides of the ledges 91.

The plates 99 are connected by intermediate bars 122 secured thereto and to the uprights 7 at each side of the space in which the former support moves, these bars being set slightly nearer together than the plates 99 the grooves 22 in the uprights 19 of the dividers on the former support permitting this arrangement. These bars have the effect of causing the box ends as they are moved forward in the machine with the former support to assume precisely the correct relation which they must sustain in the finished box, the clamping members 30 assisting in the operation by securing the box ends to the respective faces of the divider when they have been properly positioned by the bars 122.

*Side Feed.*

The side feed is best shown in Figs. 3, 6 and 8, although reference may also be had in this connection to Fig. 1. The box side magazines B located on the top deck and symmetrically arranged with respect to the former support are suitably constructed by securing corner posts to the transverse horizontal angle irons 10, the corner posts being preferably angle irons. The outer corner posts 130 stop short of the horizontal flange of the angle irons 10 and the inner corner posts 131 have their lower ends turned outwardly into a horizontal plane to form retaining lugs 132 which when the box side is being fed prevent it from tipping up out of reach of the feeding means when the box sides above it are of insufficient weight to hold it down, this condition occurring when only a few of the box sides remain in the magazine. Beyond the ends of the magazine toward the center of the machine the horizontal flanges of the angle irons 10 are omitted and to this portion of the angle iron at each side of the former support is secured a pair of plates 134 which prevent the box sides from improper movement lengthwise of the machine and each of which has a flange 135 forming a continuation of the horizontal flange of the angle iron 10 and acting as a gravity turner guide, the said guide being inclined and extending from substantially the upperdeck to substantially the lower deck of the machine. These turner guides are preferably curved.

Adjacent the outer side of each magazine there is secured to each of the angle irons 10 an angle plate or lug 136 connected by a stiffening cross piece 137 whose ends are angularly off-set so as to lie in the plane of the lugs 136 while the rest of the cross piece passes over the vertical flanges of the angle irons 10 so as to permit the feeder to be reciprocated thereunder. The means for causing this reciprocation are as follows: The vertical rock shafts 72 to which movement is given as hereinbefore described are each provided with an adjustable collar 139 to which is secured an arm 140 the end of which is pivotally connected to the system of levers for operating the feeder 138. At each side of the angle irons 10 underneath the cross piece 137 and the lugs 136 are pivoted by bolts 141, levers 142, each of which is pivotally connected with the feeder 138 by links 143. To the middle of the under side of the transverse portion of the feeder 138 is fixed the bar 144. This bar as well as the levers 142 is provided with a slot 145. A bolt 146 passes through the intersection of said slots permitting free movement of the parts but maintaining them in the proper relation. The arm 140, above referred to, is pivotally connected by a link 147 with one of the levers 142 so that the rocking of the shaft 72, pulling on lever 142 through the link 147, forces the feeder 138 forward in a manner which will be apparent on reference to Fig. 8 in which the retracted and advanced positions of the mechanism are shown in full and in dotted lines respectively. It will be understood that as the feeder 138 moves forward under the magazine, it moves the lowest blank out of the magazine, finally setting it free to the turner guides 135 down which it slides to its proper place on the former support. In order, however, to locate the sides accurately on the former, positioning and holding devices, which will now be described, are provided.

At each side of the machine about midway between the lower deck and the deck next above it, lugs or brackets 155 are secured to the uprights 7 and adjacent the respective levels of the lower deck and the deck next above it are secured to the uprights 8, pairs of lugs or brackets 156 which have vertically alined holes in which is mounted for oscillation, a vertical rock shaft 157, having an arm 158 rigidly secured thereto. This arm is connected with one of the levers 142 by a link 159 pivoted to the said arm and to the lever, said link extending downward from substantially the plane of the upper deck to the plane in which the arm 158 is located. Immediately above and below each lug 155 is pivoted thereto a short link 160 to the other ends of which are secured the ends of the positioning rods 161—162 which lie in a vertical plane and are shown as inclined or bowed having together the shape of a wish bone so that while their front ends are substantially midway between the lower deck and the deck next above it, their rear ends are much nearer one or the other of the respective decks. This gives a spread to the active portion of the device which obviously makes it effective. The rear ends of the positioning rods 161—162 are pivotally connected to arms 163—164 with which the rock shafts 157 are provided.

The operation of these positioning devices should be clear on reference to the figures above mentioned. As the feeder moves forward the positioning rods 161—162 which had been in the position shown in solid lines in Fig. 8, in which they hold the box blank in position on the former support, are first retracted so as to leave a free passage for the blank from the corresponding magazine and are then moved back into their advanced position carrying the blank with them and properly positioning it on the former support with its front end, if it projects beyond the rear face of the adjacent divider, in the rabbet 21 as the feeder 138 is retracted. In addition to placing the blank correctly these rods continue to press upon it as the box moves onward to the nailing devices thus insuring its remaining in the right place. The construction and operation is the same at each side of the machine. If desired these rods 161—162 may be extended to said station Z, looped or offset portions being provided to avoid interference with the uprights or other holding means such as the strips used at station X may be employed. The upright flanges of the angle irons 6 and 12 are however sufficient.

*Box Top Feed.*

Referring to Figs. 1, 3, 8, 9, 11 and 12: The box top magazine is located at station Y on the intermediate deck immediately over the former support. As the box tops ordinarily consist of two separate pieces the box top magazine is divided into two corresponding parts. As has already been stated, the feeding of the box tops is performed by the dividers themselves, the said tops being carried with the rest of the box to station Z where the assembled box is secured together. Between the uprights 7 at each side of the machine are secured short upright angle irons 166 extending down from the vertical flanges of the angle irons 10 which at this point are mere runners and terminating above the plane of the cross pieces 20 of the dividers. Similarly uprights 167 having a like arrangement are located between the uprights 8 at each side of the machine. On the far side of the runners 10 at the foot corners of the magazine are located uprights 168, 169 terminating above the plane of the cross pieces 20 of the dividers but a little below the plane of the tops of the feeding projections thereon so as to permit the lowest blank only to be fed. Plates 170 constituting the outer sides of the box top magazine secured to the uprights 168, 169 are set in so that the outer edge of each set of box blanks is nearer the center of the machine than the plane of the outer faces of the box sides. This insures the tops being fed in the location in which they are ordinarily secured in boxes for fruit which this machine is especially designed to make. The plates 170 have angular lugs 171 extending inward above the plane of the top of the former cross pieces 20 and slightly below the plane of the projections 23 and forming supporting ledges at the outer corners at the head of the magazine. From each of the angle irons or runners 10 depend supports 172 and 173, the former having its lower end slotted so that it constitutes a fork having the separated parallel legs 174 whose lower ends 175 are outwardly bent into the horizontal plane of the lugs 171 to form supporting ledges for the inner head corner of each pile of box tops. Pivotally mounted, as indicated in 176, in the forks formed by the parallel legs 174 is the separator 177 extending diagonally lengthwise of the machine between the two piles of box tops dividing the magazine into a pair of exactly similar sub-magazines. The foot end 178 of the separator extends at an angle and is guided in a fork formed at the lower end of the support 173 by the separated parallel legs 179, the said end 178 being provided with a slot 180 through which passes a pin 181 secured to the legs 179. The construction is such that the foot of the separator is freely movable up and down so that, while its lowest part ordinarily depends into the path of the box and dividers, it is readily pushed up out of the way by them as the former support advances returning as soon as the box end has passed and acting as a separator and positioning guide for the two half box tops being fed. The diagonal arrangement of the separator also enables it to act effectively to separate and aline the two piles of box tops.

It will be noted that in the magazine as above described no provision is made for supporting the box tops except at the head of the magazine. This is an original arrangement which is effective since when the machine is in operation the two blanks being fed, *i. e.*, the lowest blanks in each sub-magazine, are supported at their foot ends by the foot end of the box and, when they are pushed off the ledges 171, 175, by the head end also, the feeding projections or fingers 23 of the dividers passing under and holding up the rest of the blanks which are prevented from being fed forward by the uprights 169.

When the machine is started no box tops are in the magazine. A pair of box ends is fed to each side of a divider at station X and a pair of box sides is fed at station Y. This, however, does not complete the first box since its foot end is missing. It may therefore be removed from the machine or rather its sides and single end may be, before the nailers are reached, the vertical flange of the guide rails 6 being reduced in height at station Y for this purpose. The machine is then permitted to move the former another step, the top magazine is supplied with blanks and the machine will operate continuously thereafter.

Another mode of procedure is to load the head side of a divider with a box end by hand and operate the machine to load the next divider, box tops being placed in the magazine when the pair of dividers in question reaches station Y and the machine thereafter operating continuously. As the former support may be moved forward freely independently of the driving devices the machine may readily be started in this manner.

The manner in which the box tops are fed is clearly indicated in Fig. 12 where the feeding projections 23 on the top of one of the dividers are seen to be just behind the head end of the lowest box top in each of the sub-magazines. As the divider moves from station Y to station Z it carries with it the two half box tops and the box is thus completely assembled when station Z is reached.

The phrase "box tops" and the like, as used in the claims, is intended to designate the part of the box which is uppermost in the box being formed.

*Box Nailers.*

Figs. 1, 3, 13, and 14 show the general arrangement of the nailers all of which are located at station Z and operate simultaneously. They are of two kinds, the side nailers of which there are four sets, two adjacent the uprights 8 at the head of the assembled box and at each side thereof and two adjacent the uprights 4 at the foot of the box and at each side thereof, and the top nailers, of which there are two sets, one near the uprights 8 and the other near the uprights 4 at each end of the assembled box.

*Side Nailers.*

Referring to Figs. 1, 3, and 13 to 18: The side nailers are illustrated as consisting of four sets in each of which are four nailer heads 190 two of which sets are secured to the uprights 4 and two of which are secured to the uprights 8 as clearly shown in Fig. 14. Each nailer head is provided with an inclined nailer channel 191 constituting a nail magazine and with a driver slide 192. Each set of driver slides is connected to a vertical driver bar 193 which is reciprocated by means now to be described. Each pair of driver bars is connected at its ends by a pair of bars 194 which are reciprocated in the manner now to be described. The vertical rock shafts 72 are each provided with a pair of adjustable collars 195 having arms 196. One of these arms is located in susbtantially the plane of the upper of the two bars 194 the other in the plane of the lower of said bars. Links 197 pivoted to the said arms and to the middle of said bars 194 complete the operative connection. It will be understood that the devices just described are duplicated at each side of the machine.

The construction of the side nailer heads is shown in detail in Figs. 15 to 18. The nail channels are so arranged that they feed nails in a plane at right angles to the vertical plane of the nailer head and means is provided for separating the lowest nail in the channel from the rest, placing it in a pivoted nail carrier, rotating the said carrier to place the nail in the path of the driver and finally driving it home. The parts performing these functions will now be described. Driver slide 192 is provided with a driver 198 both sliding together in a driver passage or slot in the nailer head.

The driver slide which operates the other movable parts is provided with a slot 199 which constitutes a lost motion connection. A nail cut off 200 is mounted to slide in a groove or slot 201 in the nailer head, the cut off having a movement back and forth across the open end of the nail channel. The end 202 of the nail cut off is thin and on the side away from the nail channel has a curved shoulder 202' where it connects with the body of the nail cut off, the end thus being able to separate the last nail in the channel from the remaining nails and finally to move it outward by the cam action of the curved shoulder. A nail carrier 203 is pivoted in the nailer head at 204 and is provided with a nail holding groove 205 which in its nail receiving position is vertical and in its nail delivering position horizontal, the said groove lying in the longitudinal plane of the nail channel just opposite its end in receiving position. The outer side of the said groove, *i. e.*, the side away from the pivot, is slanted or beveled as indicated at 206. The nail carrier 203 is provided with a wrist pin 207 which works in a curved slot 208 in the nailer head. The nail cut off 200 carries a pin 209 extending transversely through the slot 199 in the driver slide and through a slot 210 in the nail head. A link 211 is pivotally secured to the pins 207 and 209, the simultaneous movement of the nail cut off and the nail carrier being thus assured. The body of the nailer head is provided adjacent the path of the driver with a cut out or groove 212 which permits a nail to roll down the inclined side 206 of the groove 205 in the nail carrier around its lower edge into the path of the driver. A semi-circular sheet metal guide 213 insures the correct driving of the nail. A cover plate 214 is preferably provided.

Referring to Fig. 15 which shows the parts in the position they occupy just after a nail has been driven and at which time also a nail has been fed to the pivoted nail carrier 203 it will be clear that as the driver slide 192 is retracted the remaining parts remain stationary until the end of the slot 199 reaches the pin 209 which thereafter moves with the driver slide carrying the nail cut off 200 backward across the end of the nail channel 191 and by virtue of the link 211 turning the pivoted nail carrier 203 on its pivot 204 so that it moves backward carrying the nail holding groove 205 with the nail therein from a vertical to a horizontal position opposite the cut out 212 which, as before explained, permits the nail to roll out of the groove and into a position directly in front of the driver 198. It will be clear that the driver is now retracted as is also the nail cut off leaving the nail channel unobstructed so that the lowest nail may move down into contact with the face of the pivoted nail carrier, the nail holding groove being as before stated, in a horizontal position. As the driver slide moves forward the driver 198 pushes the nail out from under the rotary nail carrier before the end of the slot 199 reaches the pin 209, at which time the movement of the nail cut off 200 and the return oscillation of the pivoted nail carrier begins. As the nail cut off moves across the open end of the nail channel 191 its thin end 202 which is below the heads of the nails passes between the shank of the foremost nail and the nail next to its separating the foremost nail from the other nails in the channel both ends of the nail being supported as shown in Figs. 17 and 18 where the nail slot 191' in the nailer head extends across the groove 212. The movements of the nail and the pivoted carrier are such that the nail holding grove 205 comes fully into position as the curved shoulder of the nail carrier acts on the lowest nail to push it into the said groove.

*Top Nailers.*

Referring particularly to Figs. 1, 3, 13, 14, 19 and 20: As already stated the top nailers are arranged in two sets adjacent the uprights 8 and the uprights 4 at the head and foot of the box. As illustrated each of these sets of top nailers consists of four nailer heads 220 secured to cross bars 221 mounted on the angle irons 12. The nailer head at each side of the machine is preferably secured as by the bolt 222 to the angle iron 12 as well as to the cross bar. Each of these nailer heads is provided with an inclined nail channel or magazine 223 and in each nailer head is located a vertically reciprocating driver 224 which depends from a driver bar 225 to which motion is given in a manner now to be explained. On the beams 76 are mounted brackets 226 in which is rotatably mounted a transverse shaft 227 on each end of which is mounted a bevel gear 228 in mesh with a bevel gear 229 on the end of each shaft 72. The transverse shaft 227 is provided with a pair of adjustable crank arms 230. In rear of the transverse shaft 227 is mounted a short transverse shaft 231 rotatably mounted in bearings 232 secured to the beams 81. This transverse shaft 231 also has a pair of adjustable crank arms 233. The corresponding crank arm of each of these two pairs of crank arms 230—233 is connected with the other by a link 234. From these links, by links or pitmen 235, the nailer bars 225 are operably connected to the rock shafts 72 which are the driving means. The connection between the links or pitmen 235 and the driver bars 225 are effected by bolts 236 passing through ears 237. The ends of the driver bars may slide on the adjacent pairs of uprights 4 and 8 and may be constructed to straddle the edges of said uprights.

The top nailer heads 220 are each provided with transverse nail cut off slides 238 similar to the nail cut off slides 200 already described in connection with the side nailers and having the function of separating the foremost nail in the nail channel 223 and feeding it into the driver passage 239. The means for reciprocating the nail cut off slides 238 will now be described. On the angle irons 12 midway between the pairs of uprights 4 and 8 are secured brackets 240 in which is rotatably mounted a transverse shaft 241 on which are secured double cranks, preferably disks 242, there being one such disk for each pair of opposite top nailer heads. Each disk is connected at diametrically opposite points with a pair of the nail cut off slides 238 by links 243. It is obvious that on the oscillation of the shaft 241 the opposite nail cut off slides 238 are moved inward, *i. e.*, toward each other, when the oscillation is in one direction, and outward, *i. e.*, away from each other when the oscillation is in the opposite direction. The nail cut offs are thus given the desired movement. Fixed to the middle of the transverse shaft 241 is an arm 244 to which is pivotally connected a pitman 245, whose upper end is pivotally connected to an arm 246 fast to the shaft 227.

At each side of the nail passage 239 in the lower end thereof is mounted a jaw 247 pivoted at 248, the said jaws being pressed toward each other by springs 249 acting on lugs 250. The opposing faces of the said jaws are provided with corresponding grooves and while normally constituting a support for the end of the nail before it is driven are capable of yielding outward to permit its passage when driver 224 descends.

It is believed that the operation of the top nailers will be clear from what has already been said. It may be well, however, to add that the nail cut offs 238 operated as just described, feed a nail in proper position into each of the driver passages in both sets of top nailer heads, this being accomplished simultaneously as will readily be understood. The drivers now descend being simultaneously operated through shafts 227; 231 and connections above described. The operation of both the top nailers and side nailers is simultaneous so that loss of time is avoided.

*General.*

One of the most important characteristics of my machine arising from features of construction above described is the nicety with which it feeds the various blanks to precisely their correct positions and retains them therein, the result being remarkable precision in the operation of the machine and uniform accuracy.

The operation of the machine already fully described in detail may be recapitulated in a general way as follows: The former support 13 carrying the spaced dividers is fed forward step by step by the double weighted pawls 69 connected to the reciprocating slide 49. The former support stops with one of the dividers underneath and half way between the end magazines A, and the box end feeding devices release a pair of box ends one from each pair of said magazines to the gravity turner guides 95 which, assisted by the side plates 96 and the side plates 99, deliver the box ends to each side of the divider in question within the pivoted clamps 30. At the same time, box sides are fed from the box side magazines B by means already described, to the turner guides 135 which, with the assistance of the side plates 134 and the positioning rods 161—162, deliver the box sides to their proper place on the former support between the two dividers at station Y. At the same time the box assembled in the previous operation of the machine is nailed together at station Z by the simultaneous action of the sets of side nailers and top nailers. These operations are performed while the double weighted pawl 59 is being retracted. When it once moves forward the divider loaded with box ends advances from station X to station Y, the guide strips 122 position the blanks properly and the clamps 30 are closed against the respective box ends as the springs 32 on the tails 31 of said members are forced out of the slots 33 onto the surface of the rails 6. At the same time the pair of dividers previously at station Y moves to station Z the feeding fingers of the head divider feeding a box top from each of the two halves of the magazine C, the box tops being suitably guided in this operation by the separator 77 and the positioning and holding rods 161—162 retaining the box sides in position. This movement also carries the completed box from station Z out of the machine where it may be removed as illustrated in Fig. 1. The continued operation of the machine is merely a repetition of the steps just described.

What I claim as my invention is:

1. A box assembling machine having three successive stations spaced apart lengthwise of the machine slightly more than one dimension of the box to be formed, a former support adjacent said stations, means for moving it forward step by step substantially the said dimension at each step, a plurality of magazines for different parts of boxes, and means for simultaneously feeding to said former support parts of a plurality of boxes.

2. A box assembling machine comprising in combination, a pair of guide rails extending lengthwise of the machine, a former support mounted to slide on said guide rails, means for moving it forward step by step along said guide rails while retaining its position otherwise unchanged, a plurality of magazines for box blanks, and means for simultaneously feeding to said former support from said magazines parts of three different boxes.

3. A box assembling machine comprising in combination, a former support, means for moving it forward step by step substantially one dimension of the box to be formed, the machine having three stations corresponding to three successive movements of said former support arranged lengthwise of the machine, box blank magazines, means for simultaneously feeding a pair of box blanks of one kind, one blank for each of two different boxes at the first station, means for simultaneously feeding blanks of another kind to the former support at the second station, and devices carried by the former support for completing a box at the second station as the support moves to the third.

4. A box assembling and nailing machine comprising in combination, a former support, means for moving it forward step by step substantially one dimension of the box to be formed at each step, the machine having three stations corresponding to three successive movements of said former support arranged lengthwise of the machine, box blank magazines, means for simultaneously feeding and guiding a pair of box blanks of one kind, one blank for each of two different boxes at the first station, means for feeding and guiding sufficient blanks of the other kinds to complete a box at the second station, and nailing devices for securing together the assembled box at the third station.

5. A box assembling machine comprising in combination, a former support, means for moving it forward step by step a predetermined distance at each step, the machine having three stations corresponding to three successive movements of said former support arranged lengthwise of the machine, means for feeding box blanks at the first station, stationary blank positioning guides located at the first station and extending toward the second, means for feeding box blanks of a different kind at the second station, blank positioning and holding devices for the blanks fed at the second station, and devices carried by said former support for feeding box blanks of a third kind as the former support moves from the second station toward the third station.

6. A box assembling and nailing machine comprising in combination, a former support, means for moving it forward step by step a predetermined distance at each step, the machine having three stations corresponding to three successive movements of said former support arranged lengthwise of the machine, means for feeding box blanks at the first station and means for feeding box blanks of a different kind at the second station, devices carried by said former support for feeding box tops as the former support moves from the second station toward the third station, nailing devices at the third station for fastening the parts of the box together, and means for operating said feeding and nailing devices.

7. A box assembling and nailing machine comprising in combination, a former support, a continuous series of upright formers thereon, means for feeding said support forward in a straight line step by step substantially one dimension of the box to be formed at each step, a plurality of magazines for different parts of boxes, means for simultaneously feeding parts of different boxes from said magazines to different formers at each step, nailing devices beyond said feeding devices toward the foot of the machine, and means for completing the assembling of a box before the former support carries it to the nailing devices.

8. A box assembling and nailing machine comprising in combination, a support, a plurality of dividers extending transversely across said support and spaced apart substantially one dimension of the box to be formed, means for moving said support forward step by step substantially said dimension at each step, the machine having three stations arranged lengthwise of the machine and corresponding to three successive movements of said support, means for feeding parts of two different boxes to opposite sides of a divider at the first station, means for simultaneously feeding a plurality of different box parts to another box at the second station, and means for securing the assembled box together at the third station.

9. A box assembling machine comprising in combination, a support, a plurality of spaced transverse dividers thereon, means for moving said support step by step substantially the distance said dividers are spaced apart at each step, the machine having three stations arranged lengthwise of the machine and corresponding to three successive movements of said support, means for feeding a pair of box blanks one to each side of each divider when it is at the first station, means for feeding a pair of blanks of a different kind to each pair of adjacent dividers when it is at the second station, and means for completing the box as it moves from the second station toward the third station.

10. A box assembling machine having successive stations equally spaced lengthwise of the machine slightly more than one dimension of the box to be formed, a former support extending lengthwise of the machine past said stations, means for intermittently moving said former support step by step, each step being equal to the distance between two stations, means for feeding box blanks of one kind to said former support at the first station, means for feeding box blanks of a second kind to said former support at the second station, blank positioning devices mounted on the frame at each side of the former support at the second station, and devices suitably correlated with said feeding devices for blanks of the second kind for operating said positioning devices.

11. A box assembling machine comprising in combination, an endless former support and means for moving the same step by step predetermined distances, box end magazines over said former support, gravity turner guides between said magazines and former support, feeding means for removing individual box ends from said magazines and releasing them to said gravity turner guides, box side magazines located in a plane above said former support a step in advance of the point at which the box ends are fed, gravity turner guides between said box side magazines and the former support, means for feeding box sides from said magazines to said gravity turner guides, devices for clamping said ends in place, devices for positioning and holding said sides in place, a magazine for tops located just over said former support, and means carried by said support for feeding box tops from said magazine into place on the box as the former support moves away from the point at which box sides are fed.

12. A box assembling machine comprising in combination, a former support, means for moving it step by step in the direction of the length of the machine each step being substantially one dimension of the box to be formed, a pair of box blank magazines located over said support and nearer together than the distance between the back and the front edge of a blank, a pair of box blank magazines at opposite sides of said support and a box blank magazine over said support located nearer the foot of the machine than the first mentioned pair of magazines, and devices for feeding blanks from said magazines to said support.

13. A box assembling machine comprising in combination, a former support, means for moving the same forward intermittently step by step, magazines for different parts of boxes located over said former support and in line with each other lengthwise of the machine, and devices for feeding blanks from said magazines into place on the former support.

14. A box assembling machine comprising in combination, a frame having three supporting decks located in different horizontal planes, a former support, means for moving it intermittently along the lowest deck, box end magazines and box side magazines on the top deck, a box top magazine on the intermediate deck, means for feeding the box ends and means for feeding the box sides from the top deck to the former support, and means carried by the former support for feeding the box tops into place on the box being formed.

15. A box assembling machine comprising in combination, a former support, dividers thereon having substantially the cross section of the box to be formed and spaced apart the third dimension of the box, means for moving the former support forward step by step substantially the distance by which adjacent dividers are separated, box blank magazines, and devices for feeding blanks therefrom to said dividers in their correct relation in the box to be formed thus assembling a box in the space between each pair of dividers as the operation of the machine continues.

16. In a box assembling machine, a former support, a plurality of spaced formers thereon, pivoted clamping members facing opposite sides of said formers, said clamping members having tails provided with springs, and stationary guide rails forming a part of the frame provided with slots arranged to release and apply said clamping members.

17. A box assembling machine comprising in combination, a support, spaced transverse dividers thereon, means for moving said support step by step, a box blank magazine above said support, means for feeding a box blank from said magazine to the adjacent divider, positioning guides above said support at each side of the path of said dividers for coaction with the edges of said blank as it moves with the support to position the blank, and clamping members movably mounted on said support adjacent said dividers and applied by the advance of the former support to hold the correctly positioned blank in place against the face of the divider.

18. A box assembling machine comprising in combination, a pair of parallel guide rails extending lengthwise of the machine, an endless support mounted to slide on said guide rails, a plurality of transverse dividers located on said support and spaced apart substantially one dimension of the box to be formed, clamping members pivoted at each side of each of said dividers and having operating tails mounted to slide on one of said guides, said guides having slots for releasing said clamping members, the unslotted portions of the rails having a cam action to force the clamps into operative position as the support is moved along the rails, box blank magazines, and means for feeding blanks therefrom to said dividers when the clamping members are released.

19. A box assembling machine comprising in combination, an endless support, a plurality of dividers spaced apart thereon substantially one dimension of the box to be formed, clamping members pivotally secured to said support adjacent opposite faces of said dividers, said clamping members having tails provided with springs, guide rails forming a part of the frame of the machine located below said tails, and on which said springs slide, oppositely disposed box blank magazines above said support, said guide rails having slots below said magazines to receive said springs when the corresponding divider is below and between said magazines, and means for feeding a pair of box blanks from said magazines simultaneously into position between the opposite faces of the divider and its open clamps, said rails closing said clamps as the support carries the springs out of the slots.

20. In a box assembling machine, a former support, reciprocating devices for giving intermittent step by step movement thereto, box blank feeders, a pair of vertical rock shafts, operative connections between said reciprocating devices and said shafts, and operative connections between said rock shafts and said box blank feeders.

21. A box assembling machine comprising in combination, an intermittently moving former support, reciprocating means for giving intermittent step by step movement to said former support, feeders for box blanks of one kind, feeders for box blanks of another kind, and connections between said reciprocating means and said feeders for operating the same.

22. A box assembling and nailing machine comprising in combination, a former support, a continuously driven shaft, a continuously reciprocating slide, operative connections between said shaft and slide, means connected to said slide and coöperating with said former support to give it intermittent forward movement, means for feeding box ends to said support, means for feeding box sides to said support, devices for feeding box tops to said support, said means coöperating to assemble a box, nailing devices for securing said assembled box together, and operative connections between said reciprocating slide and said feeding means, some of the blanks being fed to said support and the nailing being performed while the former support is stationary.

23. A box assembling machine comprising in combination, a former support, spaced formers thereon, correspondingly spaced cleats on the under side of said support, guiding means, a slide reciprocating thereon, means to give it reciprocation, and a weighted pawl pivotally secured to said slide for co-action with said cleats.

24. A box assembling machine comprising in combination, a former support, spaced formers thereon, correspondingly spaced cleats on the under side of said support, guide rails at each side of said former support and on which it slides, guides supported by said guide rails, a slide reciprocating thereon, means to give it reciprocation, and a double weighted pawl pivotally secured to said slide and having two members each of which slides on one of said guides and both of which coact simultaneously with a given cleat adjacent its respective ends.

25. A box assembling machine comprising in combination, parallel guide rails, a former support slidably mounted thereon, guides depending from said guide rails, a driving slide mounted for reciprocation thereon, a double weighted pawl for coaction with the under side of said support pivotally connected to said slide and having members which straddle the said guides from the side having parts capable of sliding on the upper side of said guides and other parts capable of sliding on the under sides of said guides, and means for reciprocating said driving slide.

26. A box assembling machine comprising in combination, parallel guide rails, a former support slidably mounted thereon, guides depending from said guide rails, a driving slide mounted for reciprocation thereon, a double weighted pawl for coaction with the under side of said support pivotally connected to said slide and having members which straddle the said guides from the side having parts capable of sliding on the upper side of said guides and other parts capable of sliding on the under sides of said guides and having a stop plate extending at an angle to the rest of said parts and retaining the pawl in proper position, and means for reciprocating said driving slide.

27. A box assembling machine comprising in combination, an intermittently moving former support, a slide beneath said support, means for reciprocating said slide, a weighted pawl secured to said slide for coaction with the under side of said support, means for feeding box blanks of one kind, operative connections between said slide and said box blank feeding means, means for feeding box blanks of another kind, upright rock shafts, operative connections between said slide and shafts, and operative connections between said shafts and feeders.

28. A box assembling and nailing machine comprising in combination, a former support, reciprocating means for moving it intermittently step by step, means for feeding box blanks of one kind, means for feeding box blanks of a second kind, box nailing devices, means for operating said first named box blank feeding means, upright rock shafts, means for rocking said shafts, operative connections between said shafts and said last named box, blank feeding means, and operative connections between said shafts and said box nailers.

29. A box assembling machine comprising in combination, a former support, a box blank magazine above said support, a gravity turner located between the magazine and the former support, said magazine having a pair of oppositely disposed transverse ledges on which the blanks rest, a pair of reciprocating feeders, operative connections between said feeders, and means for reciprocating the feeders to feed a blank alternately in opposite directions and set it free to the gravity turner.

30. A box assembling machine comprising in combination, a former support, a box blank magazine above the same having at opposite ends transverse ledges and a horizontal slot adjacent one of these, a pair of reciprocating feeders, operative lost motion connections between said feeders, and means for moving one of said feeders toward the magazine to move the near end of the blank acted upon beyond the edge of the near ledge and the far end of the blank into said slot on one part of the stroke while the other feeder of the pair on the return portion of the stroke acts on the far end of the said blank to feed its near end under the ledge on which it formerly rested, and to release the far end from the other ledge, the blank thus released from both ledges being fed onward at the next stroke until it is free to yield to the action of gravity.

31. A box assembling machine comprising in combination, a box blank magazine having at opposite sides transverse ledges, a reciprocating ledge mounted adjacent said magazine and having two active faces at different levels brought into operation on successive strokes, the first of said active faces feeding the blank off one of said ledges and over the other, a second reciprocating feeder operatively connected to the first and acting to feed the blank thus released back under the ledge on which it previously rested, turner guides between which and the under edge of said ledge the blank rests, said second active face of the reciprocating ledge acting on the next stroke to set free the blank from the under side of the first ledge, and means for operating said feeding devices.

32. In a box assembling machine, a pair of box blank magazines arranged face to face and nearer together than the distance between the back and the front edge of a blank, and means for simultaneously feeding blanks from said magazines in opposite directions.

33. In a box assembling machine, a pair of box blank magazines arranged face to face and nearer together than the distance between the back and the front edge of a blank, and supporting the blanks in one plane, and means comprising stationary guiding devices for simultaneously feeding blanks from said magazines in opposite directions into planes substantially at right angles to the said first plane.

34. A box assembling machine comprising in combination, a former support, a pair of box blank magazines arranged face to face and nearer together than the distance between the back and the front edge of a blank, a divider on said former support, and means for simultaneously feeding a blank from each of said magazines to opposite sides of said divider.

35. A box assembling machine comprising in combination, a former support, means for moving it forward step by step, a pair of box blank magazines arranged face to face near together above said support, a plurality of transverse spaced dividers on said former support, and means for feeding a blank from each of said magazines to opposite sides of the divider which is below and between said magazines.

36. A box assembling machine comprising in combination a pair of box blank magazines arranged face to face and near together, reciprocating ledges one at the head and one at the foot of said pair of magazines, guides between said magazines, another pair of feeders reciprocable on said guides, operative lost motion connections between said reciprocating ledges and said feeders, and means for operating said feeding devices to release and feed the blanks from said magazines toward each other.

37. A box assembling machine comprising in combination, a former support, a pair of box blank magazines arranged end to end over said support and located nearer together than the distance between the back and the front edge of a blank, each magazine having transverse blank supporting means at its foot and transverse blank supporting means at its head and having transverse slots in their adjacent ends just above the blanks supporting means, and simultaneously operating reciprocating feeding devices for moving the two bottom blanks one in each magazine toward each other then away from each other and finally toward each other.

38. A box assembling machine comprising in combination, a former support, a pair of oppositely disposed box blank magazines above said support and each provided at its bottom with two transverse supporting ledges, turner guides and guiding side plates below said magazines, a pair of reciprocating feeders beyond said magazine toward the front and rear of the machine respectively, a pair of feeders reciprocably mounted between said magazines, each of said first named feeders having two upright feeding faces and a supporting ledge intermediate said faces, and means for simultaneously operating said feeders, the exterior feeders releasing the lowest box blank from the outer ledges while the other feeders move away from the first and on their return movement push the box blanks under the outer ledges thus freeing them from the inner ledges and the second vertical face acting to release the box blanks on the next stroke to the turner guides.

39. A box assembling machine comprising in combination, a pair of oppositely disposed box blank magazines, a guide below each of said magazines, a slide on each of said guides, a blank feeder secured to each of said slides, a pivoted operating lever, connections between said lever above its pivot and one of said slides, connections between said lever below its pivot and the other of said slides, guides between said magazines, a pair of feeders sliding thereon, links connecting each of said slides with one of said last named feeders, and means for giving movement to the operating lever.

40. A box assembling machine comprising in combination, a former support, a box blank magazine above said support, said support and the bottom of said magazine lying in horizontal planes, a pair of guide rails, one at each side of said magazine and extending from substantially the plane of the bottom of the magazine to a point adjacent the plane of the former support, and feeding means for engaging a single box blank removing it from the magazine and permitting it to pass by gravity down along said guide rails to said former support.

41. A box assembling machine comprising in combination, a former support, transverse dividers thereon spaced apart substantially the length of the box to be formed, means for moving said former support forward step by step substantially one dimension of the box to be formed at each step, a box blank magazine above said support, gravity guiding means between said magazine and support, feeding means for engaging a single box blank removing it from the magazine and releasing it to the gravity guiding means, positioning devices located at one side of the former support, means for operating said feeding means, and operative connections between said feeding means and said positioning devices suitably correlated to cause the positioning devices to force the box blank into its proper position between the adjacent dividers and to hold it in said position as the former moves.

42. A box assembling machine comprising in combination, a former support extending lengthwise of the machine, a pair of box blank magazines symmetrically located avove said support and on each side thereof, gravity guiding means between each of said magazines and said support, feeding devices for each magazine, a pair of upright rock shafts at each side of the machine, and means for rocking the said shafts and thus operating the corresponding blank feeding means.

43. A box assembling machine comprising in combination, a former support extending lengthwise of the machine, a pair of box blank magazines symmetrically located above said support and on each side thereof, turner guides terminating adjacent said magazines and support, reciprocating feeding devices acting simultaneously to feed a box blank from each of said magazines and release it to said gravity guides, means for operating said feeding devices, positioning and clamping devices, and operative connections between said reciprocating feeding means and said positioning devices for causing the latter to engage the blanks when they reach the support, force them into place on the former support and hold them in position.

44. In a box assembling machine a blank positioning device comprising a pivotally supported blank positioning member, a swinging link pivoted to the frame and to one end of said blank positioning member, a rock shaft having an arm to which the blank positioning member is pivoted, and means for rocking said shaft to swing the blank positioning member toward and from the blank.

45. In a box assembling machine, a blank positioning device comprising a pair of diverging positioning rods, a swinging link pvoted to the frame and to the converging ends of said rods, an upright rock shaft having arms of substantially the same length as the said link, said arms being seperated and each being pivotally secured to the other end of one of the said diverging positioning rods, and means for rocking said shaft to swing the blank positioning rods toward and from the blank maintaining them in a vertical plane parallel with the proper position of the assembled blank.

46. A box assembling machine comprising in combination, feeding devices for box blanks comprising parallel supports for the blanks, lugs secured thereto at each side thereof, cross members connecting said lugs, a pair of levers pivoted at one end to said lugs and at the other to a swinging bar pivoted at its other end to the reciprocating pusher, a bar fast to the center of said pusher, said pivoted levers and said last named bar crossing each other and being provided with slots and with a loose pin connection, and operating means connected to one of said levers for reciprocating the pusher.

47. A box assembling machine comprising in combination, a magazine for blanks comprising horizontal parallel angle irons having horizontal flanges acting as supporting ledges at opposite sides of said magazine, upright angle irons constituting the corners of said magazine and stopping short of the said supporting ledges to leave space for the passage beneath them of a blank, guides at opposite sides of said magazine having flanges constituting continuations of said ledges, and means for feeding blanks along said ledges underneath the ends of said uprights.

48. A box assembling machine comprising in combination, a former support, a box blank magazine, said support and magazine lying in different horizontal planes, gravity guides extending downward from the plane of the bottom of the magazine to that of the former support, means for feeding the bottom blank from the stack of blanks in the magazine and freeing it to the gravity guides, and lugs projecting from the frame adjacent the front of said magazine and projecting over the passage for the blanks to limit the upward tilt of the rear end of the blank being fed.

49. A box assembling machine comprising in combination, a former support, transverse dividers thereon spaced apart substantially one dimension of the box to be formed, said dividers having their outer corners rabbeted, means for moving said former support step by step substantially said dimension at each step, devices for feeding box blanks of one kind to the opposite faces of each divider between said gravited corners, devices for feeding box blanks of another kind to said former support with their opposite ends resting in a pair of said rabbeted corners, and means for holding said last mentioned blanks in said position as the former moves.

50. A box assembling machine comprising in combination, a former support, means for moving it forward intermittently step by step, means for feeding box ends to said support, means for feeding box sides to said support, a magazine for box tops located directly over said former support and having a supporting ledge at its head end, the lowermost box top in the stack of box tops resting at its forward end upon the partially formed box only, and feeding means carried by said former support for sliding the lowermost of said tops onward into place on the box being formed.

51. A box assembling machine comprising in combination, a former support, means for moving it forward intermittently step by step substantially one dimension of the box being formed at each step, a plurality of correspondingly spaced transverse dividers carried by said former support, a magazine for box tops located directly over said former support and provided with a support for said tops at the head end only, and a feeding projection on each divider for sliding the lowermost top out of the magazine into its position in the box being formed as the support moves a step.

52. A box assembling machine comprising in combination, a former support, means for giving the same intermittent step by step movement in the direction of one dimension of the machine, a magazine for box tops located directly over said former support, a separator extending lengthwise of the machine in said magazine and dividing it in half, said separator being freely movable vertically at its lower end and normally extending below the plane of the bottom of the magazine, said magazine having supporting means for the tops at its head end only, and a pair of devices carried by said support for coaction with the two half box tops in each of the halves of the magazine to slide the same forward freeing them from the supporting means as the support moves a step and locating them in their proper place on the box being formed, the separator in the magazine automatically yielding momentarily to permit the passage of the former support and its contents underneath the depending end thereof.

53. A box assembling machine comprising in combination, a former support, means for moving it forward step by step, a magazine for box tops located directly over the former support and having in its central plane uprights at both the head and the foot end of the magazine, and a separator pivoted in the upright at the head end of the magazine and extending diagonally forward and downward, its lower end normally projecting below the bottom of the stacks of tops and being provided at its lower end with a foot working automatically up and down in the support at the foot end of the magazine thus dividing it into halves.

54. A box assembling and nailing machine comprising in combination, a former support, means for moving said former support forward step by step, box end feeding devices, box side feeding devices, sets of box top nailers, sets of side nailers, means for simultaneously operating said feeding devices and nailers to feed said blanks to the former support and to fasten an assembled box together while the former support is stationary, and devices for feeding box tops to said support while it is moving and before the nailer is reached.

55. A box assembling and nailing machine comprising in combination, means for assembling a box, sets of top nailers, sets of side nailers, a pair of vertical rock shafts, operative connections between said rock shafts and said top nailers, operative connections between said rock shafts and said side nailers, and means for rocking said shafts.

56. A box assembling machine comprising in combination, a former support, formers for a plurality of boxes fixed on said support against rotation, means for moving said support forward, a plurality of magazines for different parts of boxes, and means for simultaneously feeding from said magazines to different formers parts of a plurality of boxes.

57. A box assembling machine comprising in combination, a flexible endless support, a frame sustaining the upper run of said endless support, means for moving it forward in a straight line step by step, fixed formers spaced apart thereon, a plurality of magazines for different parts of boxes, and means for simultaneously feeding therefrom to different formers corresponding parts of a plurality of boxes.

58. A box assembling machine comprising in combination, an endless support, formers fixed thereon, means for moving said support forward step by step substantially one dimension of the box to be formed at each step, a plurality of magazines for different parts of boxes, and means for simultaneously feeding to different formers parts of a plurality of boxes.

59. A box assembling machine having successive stations equally spaced lengthwise of the machine slightly more than one dimension of the box to be formed, a former support extending lengthwise of the machine past said stations, means for intermittently moving said former support step by step, each step being equal to the distance between two stations, means for feeding box ends to said former support at the first station, means for feeding box sides to said former support at the second station, blank positioning devices mounted on the frame at each side of the former support at the second station, means for feeding box tops, and devices suitably correlated with said box side feeding devices for operating said positioning devices.

60. A box assembling machine having three successive stations equally spaced lengthwise of the machine slightly more than one dimension of the box to be formed, a former support extending lengthwise of the machine past said three stations, means for intermittently moving said former support step by step, each step being equal to the distance between two of said stations, means for feeding box blanks of one kind to said former support at the first station, means for feeding box blanks of another kind to said former support at the second station, and means for holding said blanks in proper position on said support.

61. A box assembling machine comprising in combination, a former support, formers thereon, two magazines for box blanks located face to face above said support, inclined stationary gravity guides extending from substantially the plane of the bottom of each magazine to substantially the plane of the support, blank separating means between said guides below said magazines and above said formers, and feeding devices for removing a single blank from each magazine and releasing it to said gravity guiding means between said guides on opposite sides of said blank separating means.

62. A box assembling machine comprising in combination, a former support, a pair of box blank magazines arranged face to face over said support, a divider on said support of less thickness than the least dimension of the box to be formed, and means for simultaneously feeding a blank from each of said magazines in opposite directions to opposite sides of said divider.

63. A box assembling machine comprising in combination, a former support having thereon transverse dividers spaced apart substantially one dimension of the box to be formed, said dividers having outer corners rabbeted, means for feeding blanks of one kind to the face of said divider, and means for feeding blanks of a different kind into position with their edges in said rabbeted corners.

64. A box assembling machine comprising in combination, a support, means for moving it forward intermittently, means for feeding box blanks of one kind to said support, means for feeding box blanks of another kind to said support, an open-bottomed magazine for box blanks of a third kind located directly over said former support and having blank supporting means at its head end only, said former support having means for supporting assembled box blanks of the first two kinds only, the lowermost box blank in the open-bottomed magazine resting at its end on the partially formed box, and feeding means carried by said former support for sliding said lowermost blank onward into place in the box being formed.

65. A box assembling machine comprising in combination, a former support, a series of formers thereon spaced apart substantially one dimension of the box to be formed, means for moving said support forward substantially the said dimension at each step, a plurality of magazines for different parts of boxes, and means for simultaneously feeding to said former support at each step parts of a plurality of boxes, for completely assembling a box between a pair of said formers.

66. In a box assembling machine, a pair of box blank magazines arranged face to face and nearer together than twice the distance between the back and the front edge of a blank, and means for simultaneously feeding blanks from said magazines substantially edgewise toward each other.

67. In a box assembling machine, a box blank magazine, said magazine having means for supporting a blank at its front and rear edges, and means for moving such blank in said magazine alternately in opposite directions to free one of said edges and then the other.

68. In a box assembling machine, two magazines facing each other, each having means for supporting a blank at its front and rear edges, and means for simultaneously moving two blanks, one in each magazine, alternately in opposite directions to free one of said edges and then the other.

69. A box assembling and nailing machine comprising parallel ways, a support slidable along said ways, means for moving said support intermittently along said ways always in the same direction, means for assembling parts of a box on said support when it is in one position, means for completing the assembling of said box when the support is in another position, and nailing devices for fastening the box together.

70. A box assembling machine comprising parallel ways, a support slidable along said ways, fixed formers carried by said support and spaced apart substantially one dimension of the box to be formed, means for assembling a box on said support between a pair of said formers, and means for moving said support step by step intermittently along said ways always in the same direction and substantially the said dimension at each step.

71. A box assembling and nailing machine comprising in combination, an endless flexible support, formers carried thereby, and spaced apart substantially one dimension of the box to be formed, means for assembling boxes between pairs of said formers, means for moving said support forward intermittently step by step substantially the said dimension at each step, and nailers for securing said boxes together.

72. A box assembling and nailing machine comprising in combination, a support, means for moving it forward step by step substantially one dimension of the box to be formed at each step, the machine having stations corresponding to successive movements of said support arranged lengthwise of the machine, box blank magazines, means for simultaneously feeding and guiding a pair of box blanks of one kind, one blank for each of two different boxes at the first station, means for feeding and guiding sufficient blanks of the other kinds to complete a box at the second station, and nailing devices for securing together the assembled box.

73. A box assembling and nailing machine comprising in combination, a support, a plurality of dividers extending transversely across said support and spaced apart substantially one dimension of the box to be formed, means for moving said support forward step by step substantially said dimension at each step, the machine having stations arranged lengthwise of the machine and corresponding to successive movements of said support, means for feeding parts of two different boxes to opposite sides of a divider at the first station, means for simultaneously feeding a plurality of different box parts to another box at the second station, and means for securing the assembled box together.

74. In a box assembling machine, a former support, a former thereon, a clamping member pivotally mounted on said support adjacent said former, said clamping member having a tail, and a stationary guide rail constructed and arranged to coöperate with the tail of said clamping member to release and apply the said member.

75. In a box assembling machine, a former support, a plurality of spaced formers thereon, pivoted clamping members facing opposite sides of said formers, said clamping members having tails provided on their under side with springs, having one end free, and stationary guide rails forming a part of the frame and on which said springs are slidable, said frame being provided with slots arranged in the path of said springs to release and apply said clamping members.

76. In a box assembling machine, a former support, reciprocating devices for giving intermittent step by step movement thereto, box blank feeders, a pair of rock shafts, operative connections between said reciprocating devices and said shafts, and operative connections between said rock shafts and said box blank feeders.

77. A box assembling machine comprising in combination, an intermittently moving former support, reciprocating means for giving intermittent step by step movement to said former support, means for feeding box blanks, and connections between said reciprocating means and said feeders for operating the same.

78. A box assembling machine comprising in combination, an intermittently moving former support, a slide beneath said support, means for reciprocating said slide, a weighted pawl secured to said slide for coacting with the under side of said support, means for feeding box blanks of one kind, and operative connections between said slide and blank feeding means.

79. A box assembling and nailing machine comprising in combination, a former support, reciprocating means for moving it intermittently step by step, means for feeding box blanks of one kind, means for feeding box blanks of a second kind, box nailing devices, means for operating said first named box blank feeding means, means for operating said second named box blank feeding means, and operative connections between said reciprocating means, said box blank feeding means and said nailing devices.

80. A box assembling machine, comprising in combination, a support, means for giving it forward motion, a magazine for box blanks located directly over said support, and a yielding separator dividing said magazine into two parts and projecting down below the same and into the path of said support.

81. A box assembling and nailing machine comprising in combination, means for assembling a box, sets of top nailers, sets of side nailers, a pair of rock shafts connected to a moving part of said box assembling means, operative connections between said rock shafts and said top nailers, and operative connections between said rock shafts and said side nailers.

82. A box assembling machine comprising in combination, a support having thereon transverse dividers spaced apart substantially one dimension of the box to be formed, means for feeding box blanks to said support between said dividers, and means for moving said support and dividers forward, said dividers having the outer corners of their rear faces rabbeted to receive the edges of said blanks in case they project.

83. A box assembling machine comprising in combination, a support having thereon transverse dividers having substantially the cross section of the box to be formed and spaced apart substantially one dimension of the box, means for moving said support and dividers forward, means for feeding blanks of one kind to the opposite faces of each of said dividers in turn, and means for feeding blanks of a different kind into position between said dividers with one of their edges in contact with the front face of one of said dividers, said dividers having the outer corners of their rear faces only rabbeted to receive the opposite edges of said last named blanks in case they project.

84. A box assembling machine comprising, a support having thereon transverse dividers spaced apart substantially one dimension of the box to be formed, and means for moving said support and dividers forward, said dividers having the outer corners of their rear faces rabbeted to receive the edge of a box blank in case it projects.

85. An endless traveling carrier having spaced upright arms against which the transverse pieces of the box are held, and pivoted clamping arms operable to turn the transverse pieces from an inclined to a vertical position and hold them against the upright arms.

86. A box assembling machine comprising an endless traveling carrier having spaced upright arms against which the transverse pieces of the box are held, a magazine for box part blanks constituting said pieces, means for feeding said box part blanks to said traveling carrier comprising means for removing individual box part blanks from said magazine and turning them through an angle, clamping arms pivoted to said traveling carrier and operable to position and clamp said box part blanks against said upright arms, and means for applying and releasing said clamping arms.

87. A box assembling machine comprising an endless traveling work support, having spaced upright arms against which pieces of the box are held, a magazine for box part blanks constituting said pieces located above said work support, clamping members pivoted to said traveling work support adjacent said upright arms, means for feeding individual box part blanks from said magazine onto said support between said arms and clamping members, and means to operate said clamping members as the work support travels to correctly position and clamp said box part blanks.

88. A box assembling machine comprising an endless traveling work support, means to give said work support intermittent movement, spaced projecting members on said support, clamping members pivoted to said traveling work support adjacent said projecting members, means for feeding individual flat relatively thin box part blanks onto said support between said clamping members and said projecting members, said blanks being supported by said work support with their lower edges in contact therewith, and means for operating said clamping members as the support travels to clamp said box part blanks to said projecting members.

89. A box assembling machine comprising an endless traveling work support, means to give said work support intermittent movement, spaced projecting members on said support, clamping members movably mounted on said traveling work support adjacent said projecting members, means for feeding individual flat relatively thin box part blanks onto said support between said clamping members and said projecting members, said blanks being supported by said work support with their lower edges in contact therewith, and means for operating said clamping members to clamp said box part blanks to said projecting members.

90. A box assembling machine comprising a work support, means to give said work support intermittent movement, spaced projecting members on said support, clamping members movably mounted on said work support adjacent said projecting members, means for feeding individual flat relatively thin box part blanks onto said support between said clamping members and said projecting members, said blanks being supported by said work support with their lower edges in contact therewith, and means for operating said clamping members to clamp said box part blanks to said projecting members.

91. In a machine of the class specified, the combination with an endless traveling carrier and a plurality of transversely disposed magazines containing stock for the transverse pieces of the box, of a plurality of longitudinally disposed magazines grouped over and on each side of the carrier and containing stock for the bottom and side pieces of the box, and means for feeding blanks from said respective magazines to said carrier.

92. In a box assembling machine, a work support having thereon a plurality of spaced projecting members, means for feeding to said support adjacent said members various parts making up a box to be formed thus assembling the same, clamping members movably mounted on said support adjacent said projecting members and within the space to be occupied by the assembled box, and means for automatically applying and releasing said clamping members.

93. A box assembling machine comprising a traveling work support, transverse projecting members thereon, means for partially assembling a box on said support adjacent said projecting members, a magazine for box blanks of the kind needed to complete the box located directly over said support, said blanks resting on part of the partially assembled box, and means carried by one of said projecting members to feed the lowermost blank from said magazine and thus complete the partially assembled box as the support moves.

In testimony whereof I affix my signature in presence of two witnesses.

JOSEPH B. KITCH.

Witnesses:
  CLINTON J. WALL,
  BLAKE C. COOK.